United States Patent
Lee

(10) Patent No.: US 11,543,879 B2
(45) Date of Patent: Jan. 3, 2023

(54) SYSTEM FOR COMMUNICATING SENSORY INFORMATION WITH AN INTERACTIVE SYSTEM AND METHODS THEREOF

(71) Applicant: Yoonhee Lee, McLean, VA (US)

(72) Inventor: Yoonhee Lee, McLean, VA (US)

(73) Assignee: Yoonhee Lee, McLean, VA (US)

( * ) Notice: Subject to any disclaimer, the term of this patent is extended or adjusted under 35 U.S.C. 154(b) by 63 days.

(21) Appl. No.: 16/798,350

(22) Filed: Feb. 22, 2020

(65) Prior Publication Data

US 2020/0218338 A1 Jul. 9, 2020
US 2022/0261065 A9 Aug. 18, 2022

Related U.S. Application Data

(63) Continuation-in-part of application No. 16/670,189, filed on Oct. 31, 2019, now Pat. No. 11,294,451, which is a continuation of application No. 15/481,509, filed on Apr. 7, 2017, now Pat. No. 10,551,909.

(60) Provisional application No. 62/956,258, filed on Jan. 1, 2020.

(51) Int. Cl.
*G06F 3/01* (2006.01)

(52) U.S. Cl.
CPC .............. *G06F 3/011* (2013.01); *G06F 3/016* (2013.01)

(58) Field of Classification Search
CPC .............................. G06F 3/013; G02B 27/017
See application file for complete search history.

(56) References Cited

U.S. PATENT DOCUMENTS

| | | | |
|---|---|---|---|
| 2007/0282564 A1* | 12/2007 | Sprague | H04N 9/3161 702/141 |
| 2008/0058836 A1* | 3/2008 | Moll | A61B 17/12172 606/130 |
| 2008/0062145 A1* | 3/2008 | Shahoian | G06F 3/0338 345/173 |
| 2009/0177452 A1* | 7/2009 | Ullrich | G06F 3/014 703/11 |
| 2009/0278798 A1* | 11/2009 | Kim | G06F 3/014 345/158 |
| 2011/0148607 A1* | 6/2011 | Zeleny | G06F 3/016 340/407.1 |
| 2011/0213664 A1* | 9/2011 | Osterhout | G06F 3/013 705/14.58 |
| 2011/0221656 A1* | 9/2011 | Haddick | G06F 3/017 345/8 |
| 2012/0075168 A1* | 3/2012 | Osterhout | G06F 3/011 345/8 |

(Continued)

*Primary Examiner* — William Lu
(74) *Attorney, Agent, or Firm* — CL Intellectual LLC

(57) ABSTRACT

In accordance with an aspect of the present disclosure there is provided an interactive system. The interactive system may include communication medium between a user and a computer rendered environment. The interactive system may include an image rendering unit to render any of the computer rendered environment. The interactive system may include a sensory signal generating unit providing, to the user, one or more sensory signals. The interactive system may include a sensory response processing unit as a body monitoring unit configured to time provisions of the sensory signals and to acquire/process one or more sensory responses of the user to the sensory signals.

20 Claims, 14 Drawing Sheets

(56) References Cited

U.S. PATENT DOCUMENTS

| | | | | |
|---|---|---|---|---|
| 2012/0194418 A1* | 8/2012 | Osterhout | .......... | G02B 27/0149 |
| | | | | 345/156 |
| 2014/0092005 A1* | 4/2014 | Anderson | ............. | G06F 3/0346 |
| | | | | 345/156 |
| 2015/0338918 A1* | 11/2015 | Cardonha | ............. | G06F 3/0482 |
| | | | | 345/156 |
| 2016/0005229 A1* | 1/2016 | Lee | ....................... | G06F 3/0488 |
| | | | | 345/419 |
| 2016/0035132 A1 | 2/2016 | Shuster | | |
| 2016/0235323 A1* | 8/2016 | Tadi | ....................... | A61B 34/30 |
| 2016/0274662 A1* | 9/2016 | Rimon | ...................... | G06F 3/16 |
| 2016/0300392 A1* | 10/2016 | Jonczyk | ................ | G06T 19/003 |
| 2017/0293348 A1* | 10/2017 | Lee | ........................ | G06F 3/016 |
| 2017/0330386 A1* | 11/2017 | Clement | ................. | G06T 19/20 |

* cited by examiner

SYSTEM FOR COMMUNICATING SENSORY INFORMATION WITH AN INTERACTIVE SYSTEM AND METHODS THEREOF

CROSS-REFERENCE TO RELATED APPLICATIONS

This application is a continuation-in-part of U.S. application Ser. No. 16/670,189, filed on Oct. 31, 2019, which is a continuation of U.S. patent application Ser. No. 15/481,509, filed on Apr. 7, 2017, which claims priority to a U.S. provisional application, 62/319,754 filed on Apr. 7, 2016, and this application also claims priority to a U.S. provisional application, 62/956,258, filed on Jan. 1, 2020, the disclosures of which are incorporated by reference in their entirety.

TECHNICAL FIELD

The invention relates generally to a system and method for processing sensory communication. More specifically, the invention relates to a system and method for communicating sensory responses between a user and an interactive system.

BACKGROUND

The physiology of a human visual field and cognitive/multisensory reactions correlates well with the human performance. However, the evaluation limited to the central visual field in interaction with an interactive system is insufficient to comprehend the overall human's performance via the interactive system.

DESCRIPTION

Figure 1:
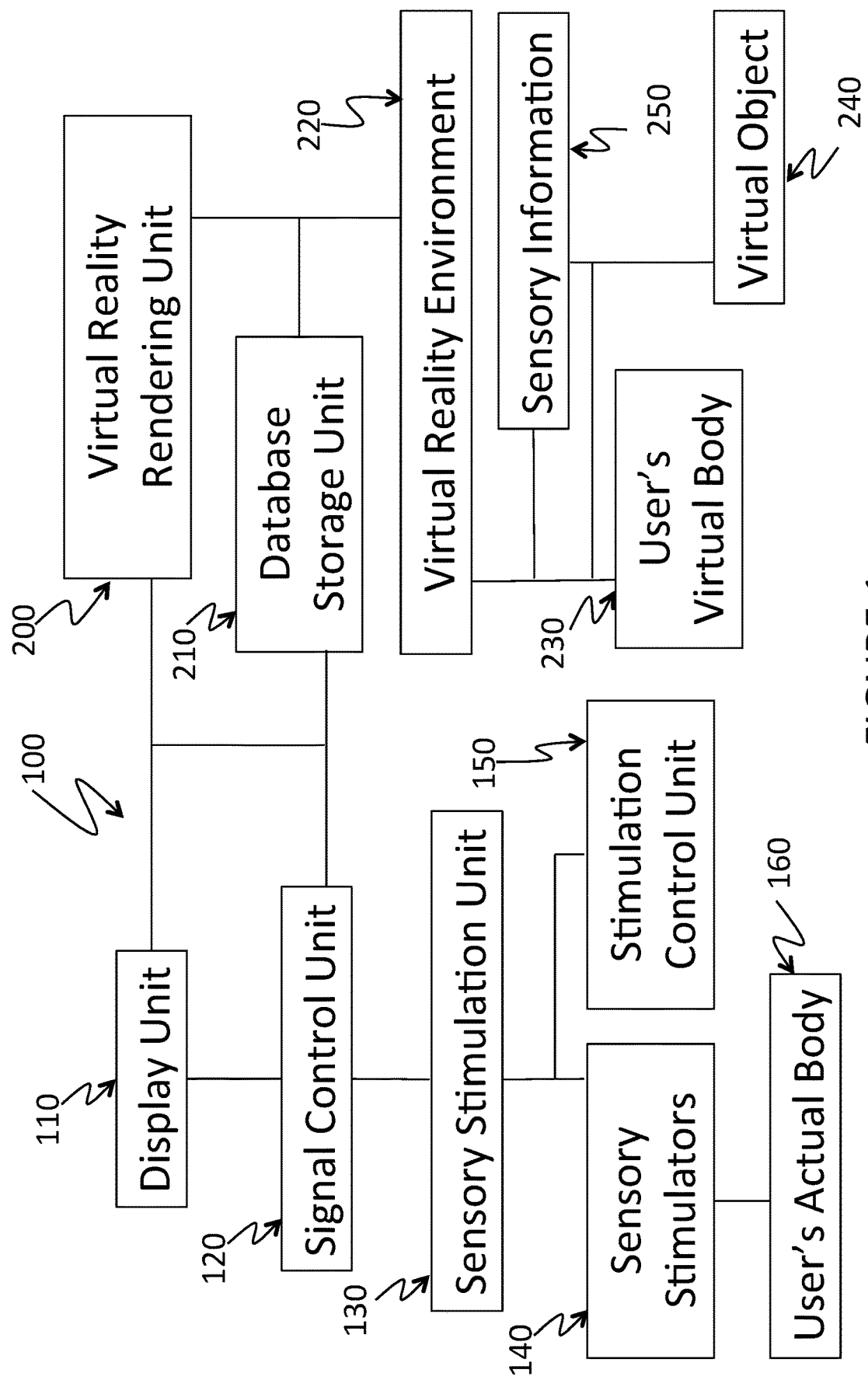
FIG. 1 shows a block diagram according to one embodiment of the disclosure.

In one aspect according to the disclosure, as shown in FIG. 1, the virtual reality system 100 includes a virtual reality rendering unit 200. In one aspect, the virtual reality rendering unit 200 may use a bussed architecture processor. The virtual reality rendering unit 200 may be configured to render a virtual reality environment 220. It is further contemplated that the virtual reality rendering unit 200 can use any known or later developed architectures, including ASIC, a programmed general purpose computer, discrete logic devices, etc.

As is understood, a virtual reality environment 220 can be designed to represent a wide variety of environments. Although an almost infinite range of such environments is contemplated by the disclosure, in one aspect according to the disclosure, the virtual reality environment 220 may contain one or more virtual objects 240 within the virtual reality environment 220. In another aspect, the virtual reality environment 220 may represent a three-dimensional environment space. In some aspect, the one or more virtual objects 240 may be paired with one or more sensory information 250. The virtual reality environment 220 may include at least partly a virtual representation of a user of the virtual reality system 100 within the virtual reality environment 220 in order to assist the user's interaction and navigation within the virtual reality environment 220.

The disclosure incorporates one or more sensory information 250 that the user can experience between actual reality and virtual reality. In one aspect according to the disclosure, interaction between the virtual object 240 and the virtual representation of the user within the virtual reality environment 220 involves sensory information 250 related to human senses such as visual information, auditory information, tactile information, olfactory information, neural information, chemical information, vibrational information, mechanical experience, pressure information, thermal information and the like, in some aspects, the interaction may involve one or more predetermined sensory information 250. For example, a fireplace in the virtual reality environment 220 may be paired with predetermined sensory information 250 such as temperature information related to the fireplace. In another aspect, a virtual object 240 may be paired with a plurality of sensory information 250. In various aspects, interaction with the virtual object 240 and the virtual representation of the user may be paired with predetermined sensory information so that different interactions with the same virtual object may be paired with different sensory information. In another aspect, the signal control unit 120 may be configured to determine a type or types of interaction or interactions and determine sensory information associated with the interaction.

The virtual reality system 100 may include a signal control unit 120. In one aspect according to the disclosure, the signal control unit 120 may be configured to communicate and/or process sensory information with the virtual reality rendering unit 200. In some aspects, the signal control unit 120 may be configured to receive sensory information 250 of the virtual object 240 in the virtual reality environment 220. In various aspects, interaction between the visual representation of the user and the virtual object in the virtual reality environment 220 may trigger the signal control unit 120 to receive and/or process the sensory information 250 of the virtual object and/or the sensory information related to the interaction. Optionally, the signal control unit 120 may be detachably connected to the virtual reality system 100.

The virtual reality system 100 may include a sensory stimulation unit 130. The sensory stimulation unit 130 may include one or more sensory stimulators 140 capable of generating sensory signals. The sensory signals may include electric signals, olfactory signals, mechanical signals, vibrational signals, pressure signals, tactile signals, gaseous signals, thermal/temperature signals, neural signals, chemical signals, visual signals or a combination thereof. In one aspect, the sensory stimulation unit 130 may be configured to determine and/or process the types and/or locations of the sensory stimulators 140 connected to the user's actual body.

One or more sensory stimulators 140 are configured to stimulate skin, external/internal muscles and/or sensory organs of the user's actual body 160. For example, one or more sensory simulators 140 may be configured to be attached to a sensory organ of the user's actual body 160 so that the sensory organ can be electrochemically or neurologically stimulated by the sensory simulator. In another example, one or more sensory stimulators 140 may be configured to be attached to skin of the user's actual body 160 so that the skin can be stimulated by the sensory simulator 140. In certain aspects, depending on the types of sensory signals, the configuration of connection between the sensory stimulator 140 and the user 160 may be adjusted.

In one embodiment according to the disclosure, the signal control unit 120 may be communicatively connected to the sensory stimulation unit 130. In some aspects, interaction between the visual representation of the user 230 and the virtual object 240 in the virtual reality environment 220 may trigger the signal control unit 120 to receive and/or process the sensory information 250 of the virtual object. In various aspects, the signal control unit 120 may be configured to receive and/or process sensory information 250 related to interaction between the visual representation of the user 230 and the virtual object 240. The signal control unit 120 may be configured to communicate the received/processed sensory information 250 with the sensory stimulation unit 130 so that the sensory stimulator 140 can stimulate the user's actual body 160 based on the sensory information 250.

In another embodiment, the signal control unit 120 may be configured to determine types and/or locations of the sensory stimulators connected to the user's actual or physical body. In one aspect, the signal control unit 120 may communicate the determined the sensory stimulators with the virtual reality rendering unit 200. Based on the determined sensory stimulators, the virtual reality rendering unit 200 may determine sensory information associated and/or compatible with the determined sensory stimulators.

In some aspects, the signal control unit 120 may include a brain computer interface to concurrently use cortical physiologies associated with different cognitive processes for device control. The brain computer interface may be connected to at least a part of the user's actual body. In various aspects, the brain computer interface may be configured to receive a brain signal of the user. The brain signal may include ipsilateral motor signals and contralateral motor signals. In certain aspects, the brain signal may include a combination of speech signals with motor signals. Other signals that may also be selectively combined include attention-related signals, signals related to cortical plasticity or feedback, electrical signals, signals related to working memory, signals related to higher cognitive operations (e.g. mathematical processing), signals related to auditory processing, and/or signals related to visual perception. The brain computer interface is configured to process the brain signal. A device may be communicatively connected to the brain computer interface. The brain computer interface may be configured to control the device based on the brain signal.

In some embodiments, the term "brain computer interface" and the acronym "BCI" refer generally to signal-processing, circuitry that acquires input in the form of raw cortical brain signals and converts the brain signals to a processed signal that is output to a computer for storage and/or further analysis. Moreover, in some embodiments, the term "BCI system" refers generally to a number of components, including a BCI that translates raw brain signals into control of a device.

In some embodiments, the term "device" refers generally to equipment or a mechanism that is designed to provide a special purpose or function. Exemplary devices including, but are not limited to, a cursor on a video monitor, computer software, environmental controls, entertainment devices, implantable controls, prosthetics, beds, and mobility devices such as wheelchairs or scooters. Moreover, the term also includes input devices that are used to control other devices such as those that are listed above. Exemplary input devices include, but are not limited to, wheels, joysticks, levers, buttons, keyboard keys, trackpads, and trackballs. In one aspect, the device may include a virtual reality rendering unit 200. In a certain aspect, the brain computer interface may be communicatively connected to the virtual reality rendering unit 200 so that the brain computer interface is configured to control the virtual representation of the user in the virtual environment to cause an interaction between the virtual representation of the user and a virtual object.

For example, when the visual representation of the user 230 interacts with the virtual fireplace in the virtual reality environment 220, the signal control unit 120 communicates the thermal information associated with the virtual fireplace to the sensory stimulation unit 130. A sensory stimulator 140 thermally stimulates the area of the user's actual body 160 to which the sensory stimulator is attached based on the received thermal information so that the user 160 can experience the temperature change in reality through the interaction in the virtual reality between the visual representation of the user 230 and the virtual object 240.

In one aspect, the virtual reality rendering unit 200 may include a database 210 including information and/or digitalized information of the virtual reality environment and virtual objects 240 constituting the virtual reality environment 220. In some aspect, the database 210 may store sensory information 250 paired with the virtual objects and/or any interaction combinations between virtual objects 240 and the virtual representation of the user 230. In various aspects, the signal control unit 120 may determine types of sensory information 250 based on the sensory stimulators connected to the user's actual body. The signal control unit 120 may communicate the determined sensory information with the virtual reality rendering unit 200. The virtual reality rendering unit 200 may locate the determined sensory information paired with any interaction combinations between virtual objects 240 and the virtual representation of the user 230 in the database.

Figure 2:
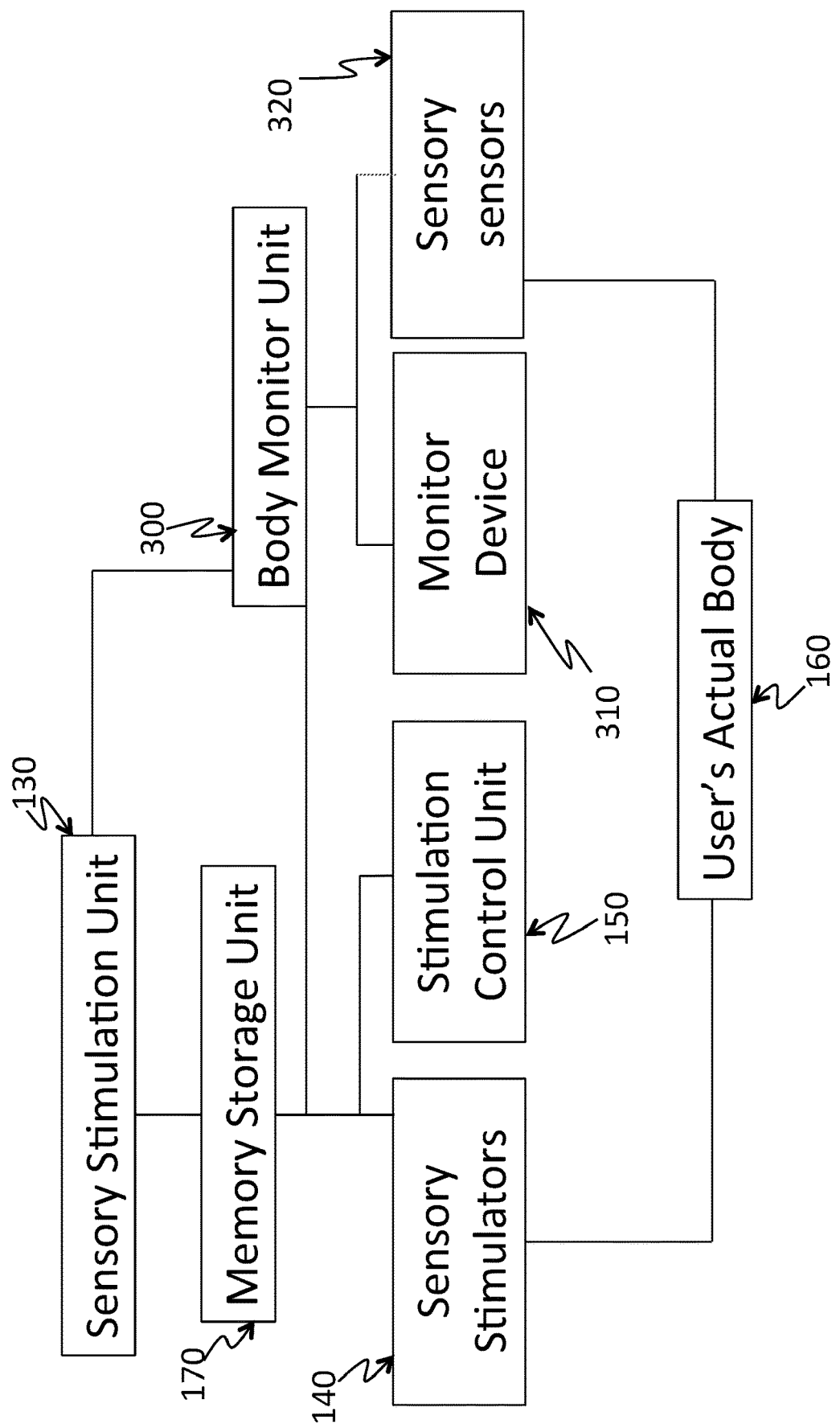
FIG. 2 shows a block diagram according to another embodiment of the disclosure.

The sensory stimulation unit 130 may include a stimulation control unit 150. The stimulation control unit 150 may be configured to adjust the degree of stimulation of one or more stimulators. The sensory stimulation unit 130 may include a memory storage unit 170 as shown in FIG. 2. A series of stimulation data applied to the user may be stored in the memory storage unit. Based on the stored stimulation data, the stimulation control unit 150 may adjust the degree of stimulation of one or more stimulators. In one aspect, the stimulation control unit 150 may incrementally adjust the degree of stimulation of one or more stimulators when the same type of stimulation is repetitively applied to the same location of the user's actual body 160. In some aspects, when the same body part is repetitively stimulated, the stimulation control unit 150 may incrementally increase or decrease the degree of stimulation of one or more stimulators connected to the same body part.

According to the disclosure, the user can experience a realistic interaction between the virtual body and the virtual object via the sensory stimulators. It is possible that an interaction between a virtual object 240 and a virtual representation of the user 230 involves a plurality of sensory information. To achieve realistic interaction, in one aspect, a virtual object may be paired with a plurality of sensory information. For example, a single interaction may be paired with a plurality of sensory information such as olfactory information, thermal information, and tactile information. When a plurality of sensory information are involved, the actual body can simultaneously experience the plurality of sensory information via the various types of stimulators attached to the actual body. Additionally, because each of virtual objects may be paired with one or more sensory information with respect to each other, even if the interaction involves the same part of the virtual body, the interactions with different virtual objects may have different combinations of sensory information. Alternatively, even if the interaction involves the same virtual object, the interaction may be paired with a different combination of sensory information depending on the predetermined sensory information associated with the interaction between the virtual object and the virtual representation of the user.

Figure 3:
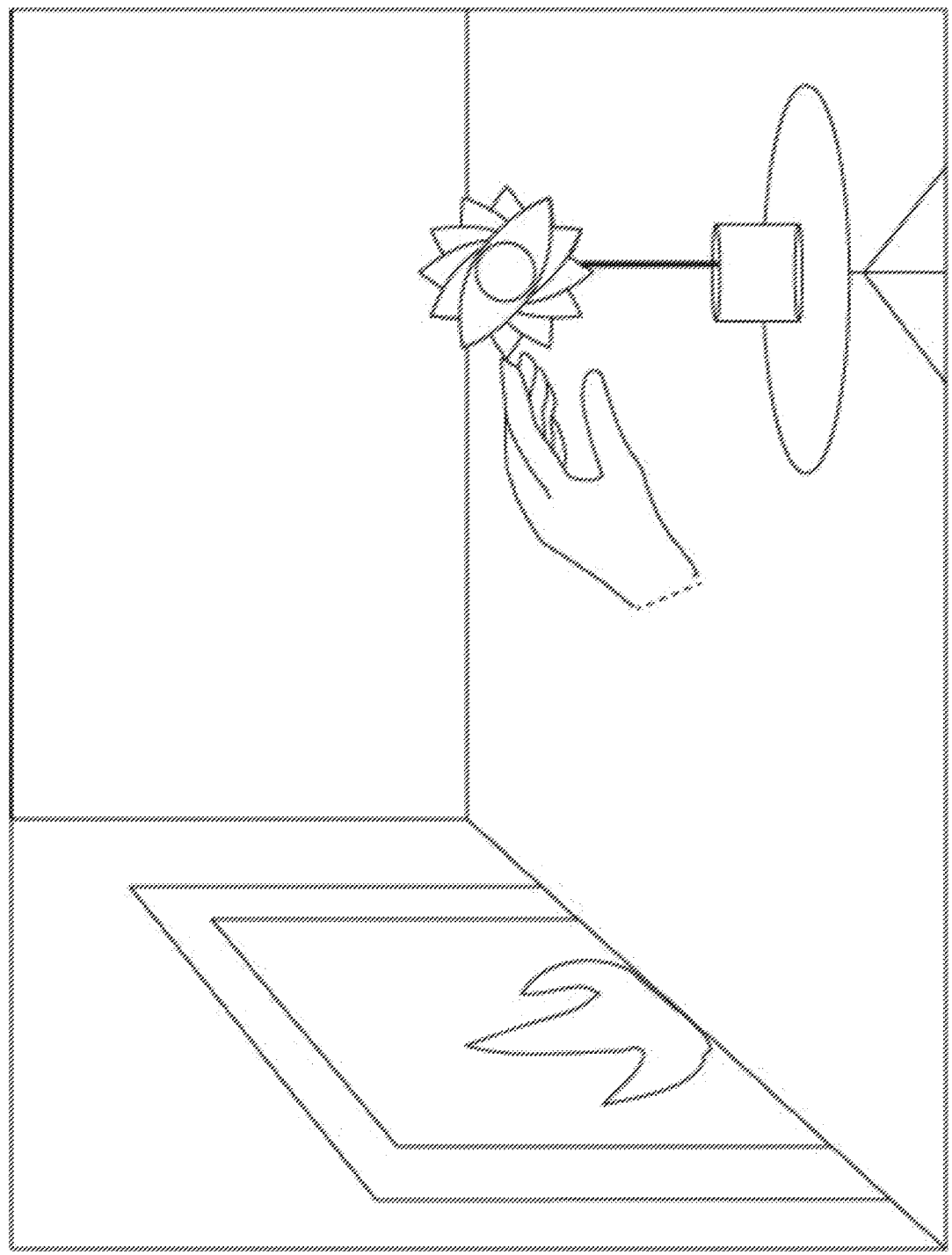
FIG. 3 shows an illustrative example according to the disclosure.

FIG. 3 exemplifies a case where a single interaction may involve a plurality of sensory information such as olfactory information and tactile information. The virtual flower may be paired with olfactory information such as fragrance together with tactile information such as pressure in the database. As the virtual representation interacts with the virtual flower, the virtual reality rendering unit 200 may look for the sensory information associated with the interaction. As the olfactory information and tactile information are determined, the sensory information is communicated with the olfactory stimulator attached to the actual olfactory organ and the tactile stimulator attached to the muscle of the user if such stimulators are placed in the desired locations in the user's body.

In another embodiment according to the disclosure, a virtual representation of the user in the virtual reality system 100 may represent a virtual body 230 of the user corresponding to the actual body 160 of the user. In some aspects, at least a part of the user's actual body 160 may be virtually represented in the virtual reality environment 220. In various aspects, a three dimensional representation of at least part of the user's actual body 160 may be virtually represented in the virtual reality environment 220.

The database 210 may contain sensory information of the virtual reality system 100. In a certain aspect, the database may contain sensory information of virtual objects. In various aspects, the database may contain sensory information associated with the interaction of the virtual representation and virtual objects. In one aspect, the sensory information of the part of the virtual body 230 may be updated in the database as the virtual body part interacts with a virtual object 240. In another aspect, the sensory information may be programmably stored so that the sensory information can be updated if desired as the sensory information of the actual body and/or the sensory stimulators are updated.

Figure 4:
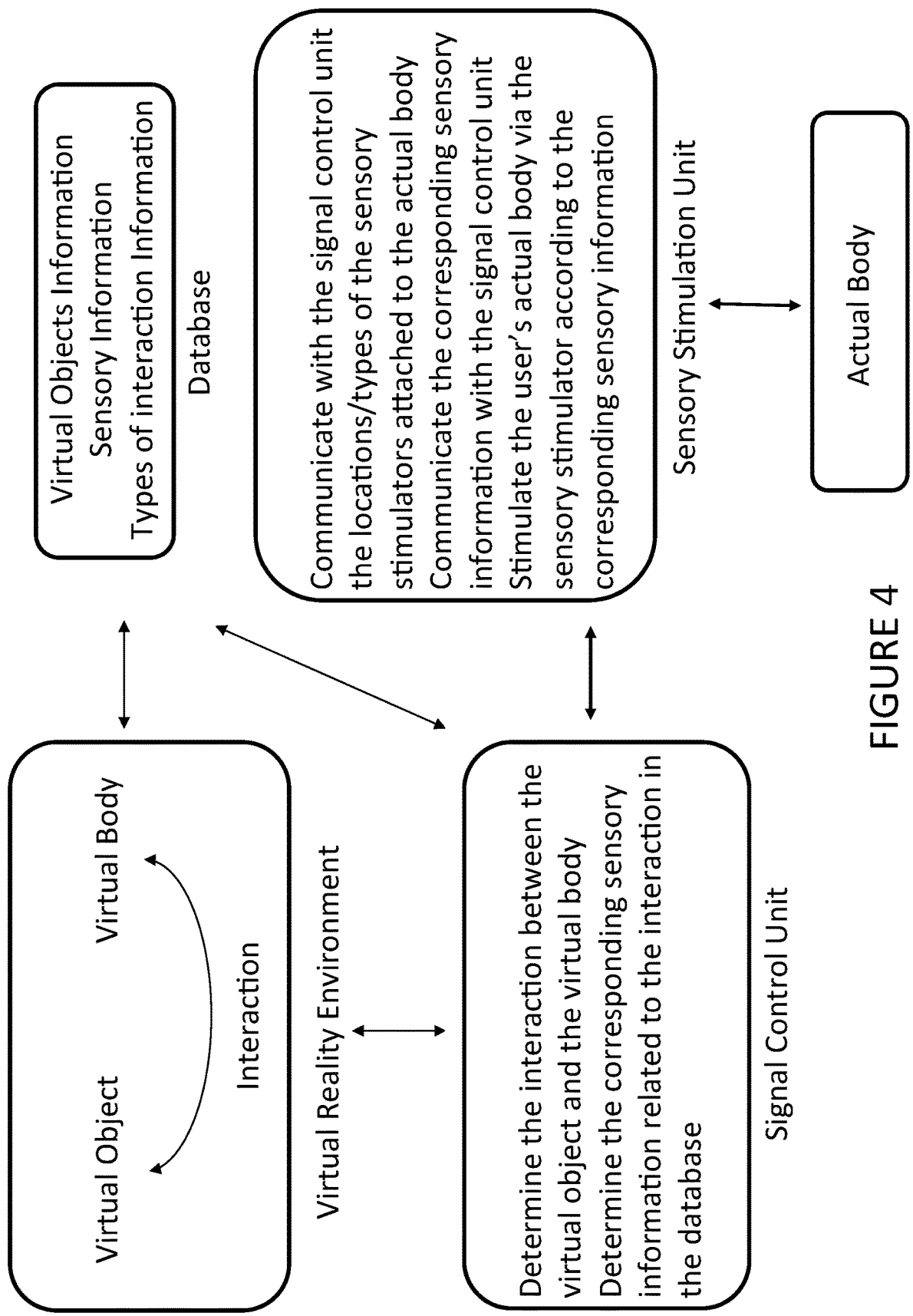
FIG. 4 shows operating processes according to an exemplary embodiment of the disclosure.

As described in FIG. 4, the virtual reality system 100 may be configured to register or synchronize the locations and/or types of one or more sensory stimulators 140 connected in parts of the actual body 160 with the equivalent parts of the virtual body 240. The virtual body may be two dimensional or three dimensional. The sensory stimulation unit 130 may communicate the locations and/or types of the one or more sensory stimulators 140 attached to the parts of the actual body with the signal control unit 120. In one embodiment, the signal control unit 120 may determine the parts of the virtual body equivalent to the parts of the actual body 160 to which the sensory stimulator 140 is attached and/or connected. Once interaction between the part of the virtual body and the virtual object is triggered, the signal control unit 120 may determine the sensory information corresponding to the interaction stored in the database. Subsequently, the signal control unit 120 may further determine the sensory information compatible to the sensory stimulators 140 and communicate with the sensory stimulator unit 130 the sensory information corresponding to the locations and/or types of the one or more sensory stimulators 140. According to the sensory information, the sensory stimulators 140 may stimulate the part of the user's actual body.

Figure 5:
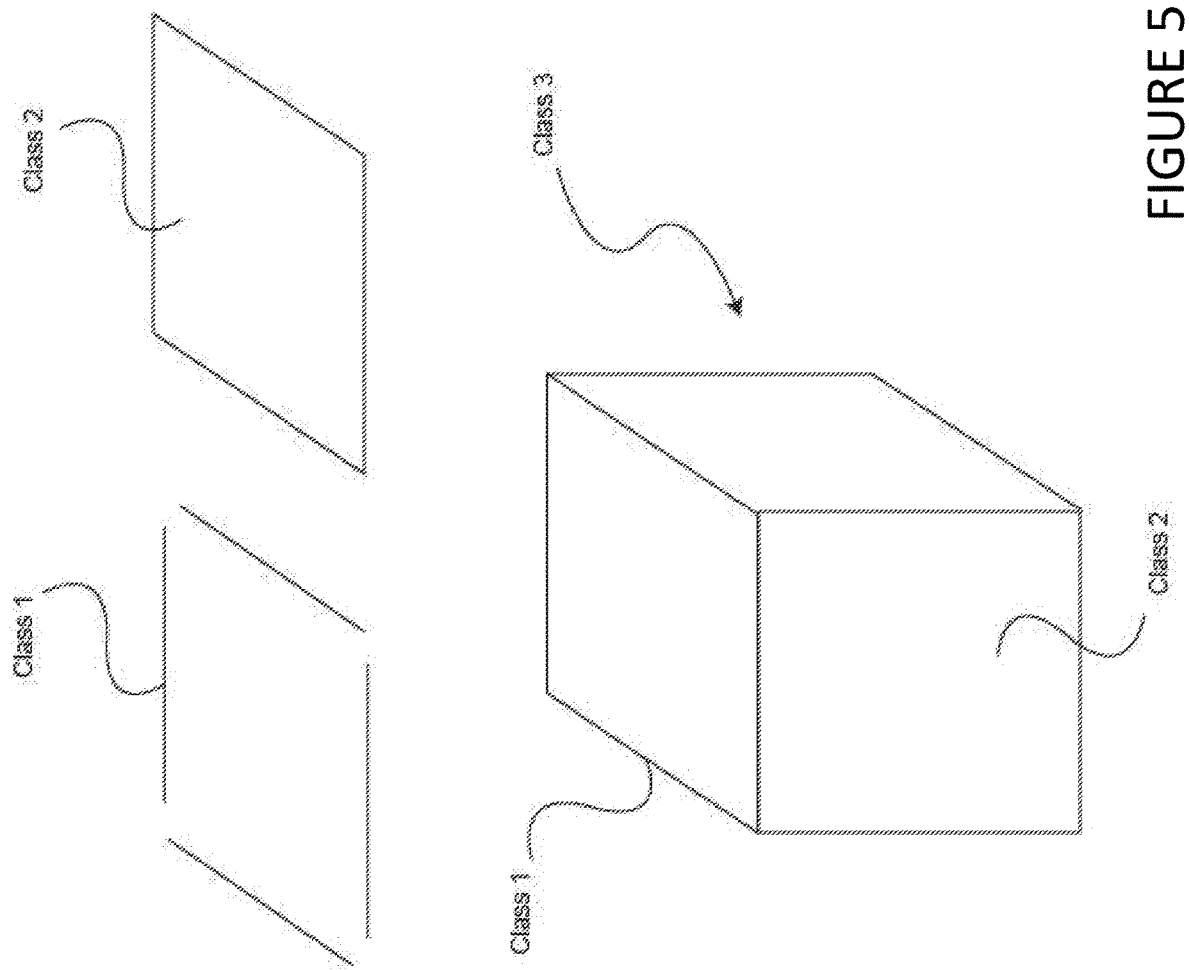
FIG. 5 shows another illustrative example according to the disclosure.

In another embodiment, a virtual object may include a plurality of sub-objects each of which has an assigned sensory information class. The database may contain a list of sensory information classes each of which has different sensory information from each other. For example, as shown in FIG. 5, a virtual cube may be constructed with faces and edges. Edges may have sensory information class, class 1. Faces may be assigned to sensory information class, class 2, wherein the class 1 is different from class 2. Every sub-object belonging to the sensory information class 2 may have the same sensory information. Similarly, every sub-object belonging to the sensory information class 1 may share the same sensory information different from the class 2. A virtual cube can be constructed with a combination of sub-objects, faces and edges, having class 1 and class 2 sensory information. When a virtual hand grabs a virtual cube in the virtual reality, a plurality of sensory information, class 1 and class 2 regarding the virtual cube can be simultaneously communicated with the real body. In some aspects, the constructed virtual object may be assigned to another sensory information, such as class 3, so that the virtual object can have sensory information of sub-objects, class 1 and class 2 together with class 3. By constructing a virtual object with various predetermined sub-objects of each of which has sensory information, an unlimited number of virtual objects each of which has a plurality of sensory information can be available.

The signal control unit 120 may be optionally connected to a body monitor unit 300 as shown in FIG. 2. The body monitor unit 300 may include a monitor device 310 connected to one or more sensory sensors 320 connected to the actual body 160 of the user. The one or more sensory sensors 320 are configured to detect the sensory signals generated in the actual body 160 of the user. In one aspect, the one or more sensory sensors 320 may be communicatively connected to the sensory stimulators 140. In some aspects, the one or more sensory sensors 320 may be integrated with the sensory stimulators 140. In various aspects, the body monitor unit 300 may be integrated with the sensory stimulation unit 130. In a certain aspect, the sensory signals detected by the one or more sensory sensors 320 may be communicated to the signal control unit 120. The signal control unit 120 may update the sensory information 250 according to the detected sensory signals received from the body monitor unit 300.

In accordance with an aspect of the disclosure, a virtual reality system 100 may include a display unit 110 as shown in FIG. 1. The display unit 110 is configured to display and/or visualize the virtual reality environment 220. It should be understood that a wide variety of display units 110 may be contemplated by the disclosure. For example, such display unit 110 may include, but is not limited to, optical projectors, computer monitor display, TV display, virtual reality goggles, holographic imaging and the like. In some aspects, the display unit 110 may be communicatively connected to the signal control unit 120. The display unit 110 is utilized to project or display an image of the virtual reality environment 220 to the user of the virtual reality system 100. In some aspects, the display unit 110 may be incorporated in a Head Mounted Display or HMD. The HMD may provide covering around eyes of the user, which when worn hides any peripheral vision. The display unit 110 may be detachably connected to the virtual reality system 100.

The virtual reality system 100 may include digital electronic circuitry, or computer hardware, firmware, software, or combinations of them. Apparatus according to the disclosure may be implemented in a computer program product tangible embodied in a machine-readable storage device for execution by a programmable processor, and methods steps thereof may be performed by a programmable processor executing a program of instructions to perform functions of the invention by operating on input data and generating output.

The sensory stimulation unit 130 and/or the sensory stimulators may be integrated with a wearable form of glasses, goggles, masks, clothes, body suits, gloves, finger covers, pants, underwear, shoes, hats, headsets, wearable accessories, attachable pads, or the like. The sensory stimulators 140 and the sensory sensors are capable of generating, detecting and/or processing sensory signals such as electric signals, olfactory signals, neural signals, gaseous signals, chemical signals, mechanical signals, visual signals, vibrational signals, pressure signals, tactile signals, thermal/temperature signals, and the like.

The sensor stimulators 140 may include but be not limited to, electric stimulators, electric muscle stimulators, humidity stimulators, thermal stimulators, neural pulse stimulators, nerve stimulators, visual displays, muscle vibrators, drug injectors, drug patches, air deliveries, pressurizers, chemical patches, mechanical muscle stimulators, piezo stimulators, electro-magnetic stimulators, speakers, hearing devices, and the like.

Figure 6:
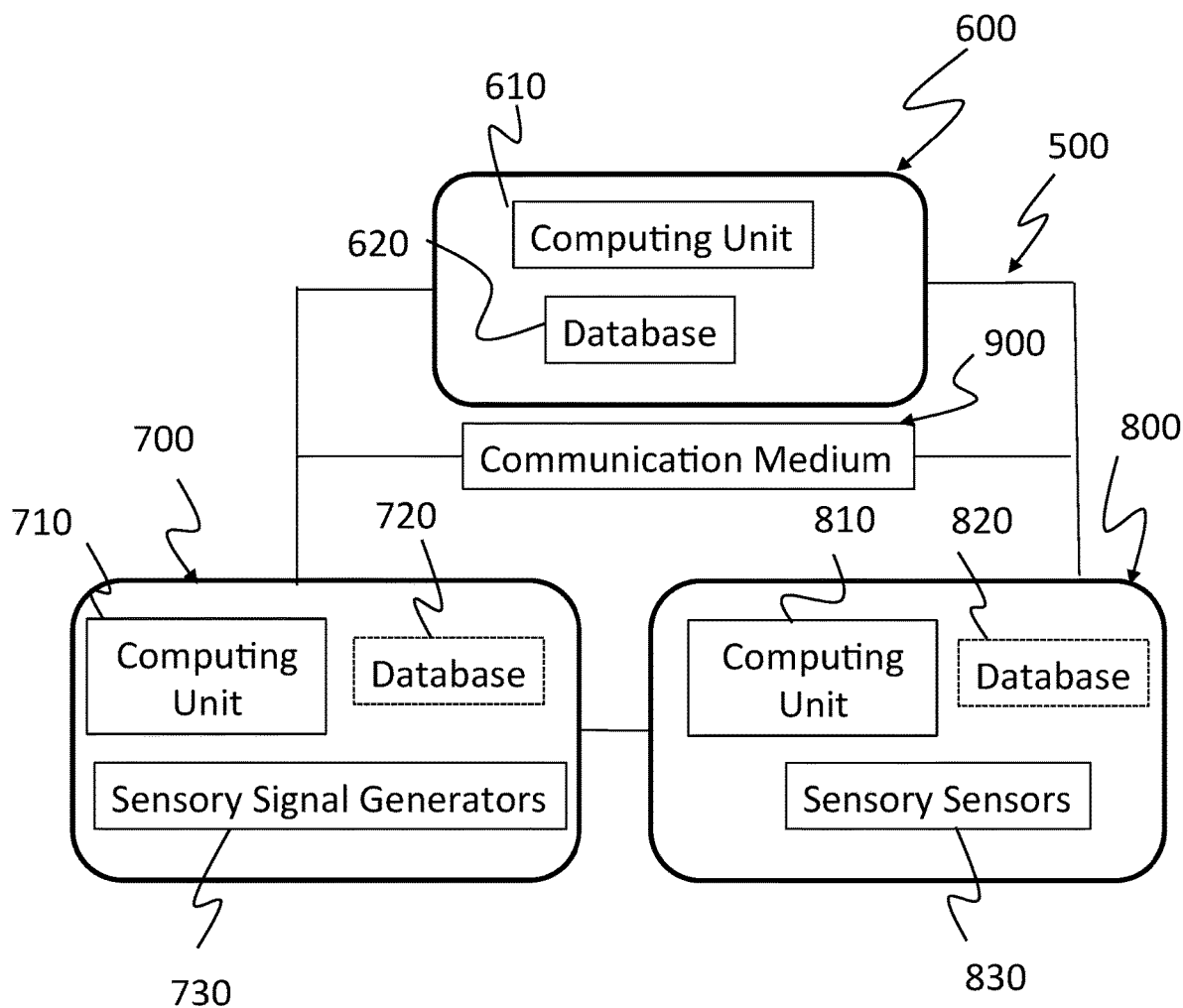
FIG. 6 shows a schematic diagram of another exemplary system in accordance with the present disclosure.
Figure 7:
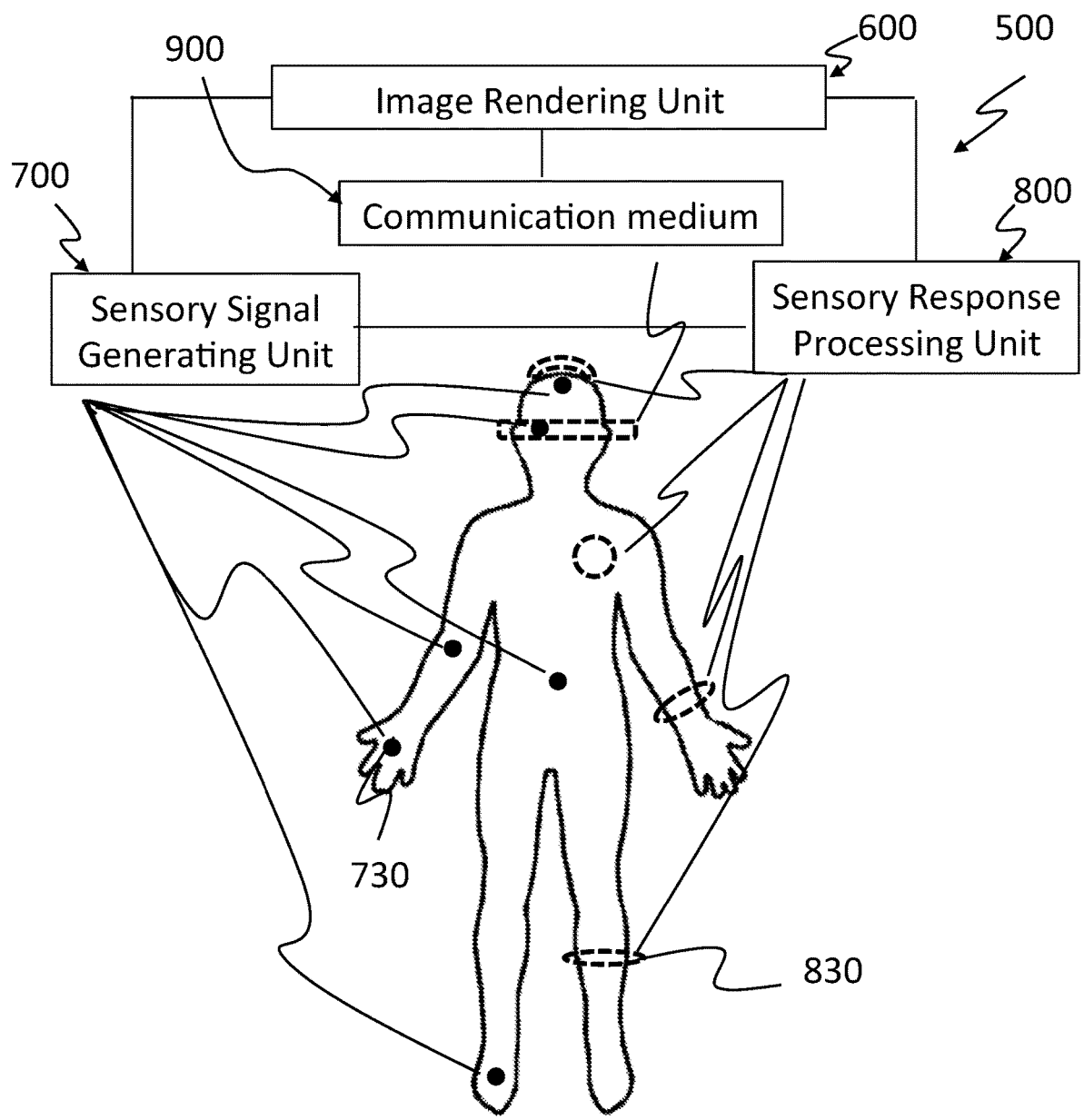
FIG. 7 shows another schematic diagram of another exemplary system in accordance with the present disclosure.

In accordance with another embodiment of the present disclosure there is provided an interactive system 500 as shown in FIG. 6. The interactive system 500 is configured to communicate sensory information with a user as illustrated with an exemplary configuration in FIG. 7. The interactive system 500 may include communication medium 900 between a user and a computer rendered environment such as a virtual reality environment. The interactive system 500 may include an image rendering unit 600 to render any of the computer rendered environment, one or more computer rendered objects, and/or a computer rendered representation of the user in the environment. For example, the interaction system 500 may be a virtual reality system 100 including a virtual reality rendering unit 200 as an image rendering unit 600. The interactive system 500 may include a sensory signal generating unit 700 such as a sensory stimulation unit 130 providing, to the user, one or more sensory signals. The sensory signal generating unit 700 may include a signal computing unit 710 executing machine logic instructions generating the sensory signals and a database 720 including a list of available sensory signals and machine logic instructions, and sensory signal generators 730. The sensory signal generating unit 700 may be at least communicatively connected with the image rendering unit 600. The user may be living organ such as an animal or human or any parts thereof.

The interactive system 500 may include a sensory response processing unit 800 as a body monitoring unit configured to time provisions of the sensory signals and/or sensory responses and to acquire/process one or more sensory responses of the user to the sensory signals. The sensory response processing unit 800 may include a response computing unit 810 executing machine logic instructions determining whether the user responds to a sensory signal and/or whether the response meets one or more pre-determined conditions. The sensory response processing unit 800 may be configured to connect with one or more of sensory sensors 830. In a certain aspect, any of the sensory sensors 830 may be in modular form so that the sensor can be detachably connected to the sensory response processing unit 800. In another aspect, a plurality the sensory response processing units 800 may be at least communicatively connected with the image rendering unit 600. In some aspects, one or more sensory response processing units 800 may be detachably connected with the communication medium 900. In a certain aspect, the sensory signal generating unit 700 may be at least communicatively connected with the sensory response processing unit 800. The sensory information is related to human senses such as visual information, auditory information, tactile information, olfactory information, neural information, chemical information, vibrational information, mechanical experience, pressure information, thermal information and the like. The communication medium 900 is configured to convey sensory information such as visual information from the image rendering unit 600 to the user. For example, a text can be sensory information containing visual information. The sensory signal generating unit 700 may apply the signals associated with the sensory information to the user. A movie can be sensory information containing visual information and auditory information. A virtual reality can provide sensory information such as visual information, auditory information, olfactory information, thermal information and so on.

In the present disclosure, a set of exemplary embodiments provides tools and techniques for enhancing intelligent evaluating, and in particular evaluating physiological conditions during interaction with a computer rendered environment. For example, some of these tools and techniques may employ active physical stimulation of a user such as a user of the virtual/augmented reality, to induce physiological changes in the user through interaction in the computer rendered environment. By measuring one or more of the user's physiological parameters (e.g., invasively and/or non-invasively measuring the user's blood pressure, eye properties, brain wave, pulse, etc.) before, during and/or after the physical stimulation during interaction with the computer rendered environment, the user's conscious and/or unconscious response to the stimulation and/or to the interaction with the computer rendered environment can be measured, and this response can be used to better estimate and/or predict the user's physiological state, cognitive state and/or clinical condition. In an example, the user's response to the physical stimulation and/or to the interaction with the computer rendered environment can be used to construct and/or refine a model that can be applied to analyze the user's physiological parameters to predications and/or estimations of the physiological state, cognitive and/or clinical conditions In an exemplary embodiment, the present disclosure further relates to a method for collecting physiological sensory responses of a user such as an animal body and a human body in interaction with computer rendered environment, including one or more sensory responses collected from one or more sensory sensors 830 at least in proximity to or in physical contact with the user to detect the sensory responses. The method may involve intermittently, periodically and/or continuously collecting the sensory responses of the user during interaction with the computer rendered environment. In some examples, a mathematical operation may be used to analyze the collected sensory responses including physiological conditions to determine the present critical state of the user.

In one exemplary embodiment, one or more sensory sensors 830 may include a physiological sensor such as a respiration sensor, a temperature sensor, a heat flux sensor, a body conductivity sensor, a body resistance sensor, a body potential sensor, a brain activity sensor, a blood pressure sensor, a body impedance sensor, a body motion sensor, an oxygen consumption sensor, a chemical sensor, a body position sensor, a pressure sensor, a light absorption sensor, a sound sensor, a piezoelectric sensor, an electrochemical sensor, an optical sensor and strain gauges. In some examples, an accommodating system 400 such as a patch, a goggle, glasses, a glove, a body wear, a wearable accessory, a watch, a ring, a helmet, a chair, a body suit, a bed, a body chamber, and/or a body capsule may be employed in conjunction with the sensory sensors 830. In another example, the sensory sensors 830 may be integrated with any form of the accommodating system 400.

In one exemplary embodiment, a set of computer-executable instructions is implemented in the sensory response processing unit 800. In accordance with yet another set of embodiments, the sensory response processing unit 800 may include a response computing unit 810 and a computer readable medium 820 in communication with the response computing unit 810. The computer readable medium 820 might have encoded thereon a set of instructions executable by the sensory response processing unit 800 to perform one or more operations, such as the set of instructions described above, to name one example. The sensory response processing unit 800 may be configured to at least communicate with the sensory sensors 830. The set of instructions may include instructions for receiving, at the sensory response processing unit 800, a set of input data such as sensory responses from one or more sensory sensors 830. The set of input data pertains to one or more physiological parameters of a physically stimulated body of the user; instructions for analyzing, with the sensory response processing unit 800, the input data to determine the user's response to the one or more physical/neurological stimulations; and/or instructions for generating profiling data concerning one or more physiological states of the user. The set of instructions may further include instructions for displaying, with a display device, at least a portion of the profiling data. In another example, the sensory response processing unit 800 may be configured to execute a set of instruction including instructions to control the sensory signal generating unit 700 to activate, deactivate, adjust and/or select sensory signal generators 730. In some examples, a plurality of sensory response processing units 800 may be provided. In some aspects, any of the plurality of sensory response processing units 800 may be in modular form that can be detachably connected with communication medium 900. In another example, a plurality of sensory response processing units 800 may be controlled by another single sensory response processing unit 800 as a main controller so that the main controller can control the plurality of sensory response processing units 800 and process data thereof. In some examples, the signal control unit 120 may be configured to communicatively connect and/or be integrated with any of the sensory response processing unit 800 and the sensory signal generating unit 700.

The present disclosure makes use of an interactive system 500 capable of cognitive/multisensory mapping of multiple sensory and cognitive responses over a user for assessment, profiling, and feedback purposes. In accordance with one aspect of the present disclosure there is provided a method of evaluating an overall sensory response of a user through interaction with computer rendered environment. The evaluation process may include any or all of: setting, with respect to the user, a number of sensory signals and/or sensory stimulations; rendering interaction between the user and the computer rendered environment or interaction between a representation of the user and an object in the computer rendered environment; associating the sensory signals with the interaction in the rendered environment; applying, upon the interaction, the one more sensory signals associated with the interaction to the user; determining one or more parts/locations of the user's body each of which is at least communicatively in contact with sensory sensors; detecting sensory response(s) from the user; associating the received sensory responses with the applied sensory signals; and building performance profile of the user based on any or all of the interactions, applied sensory signals and sensory responses associated with the applied sensory signals.

Figure 8:
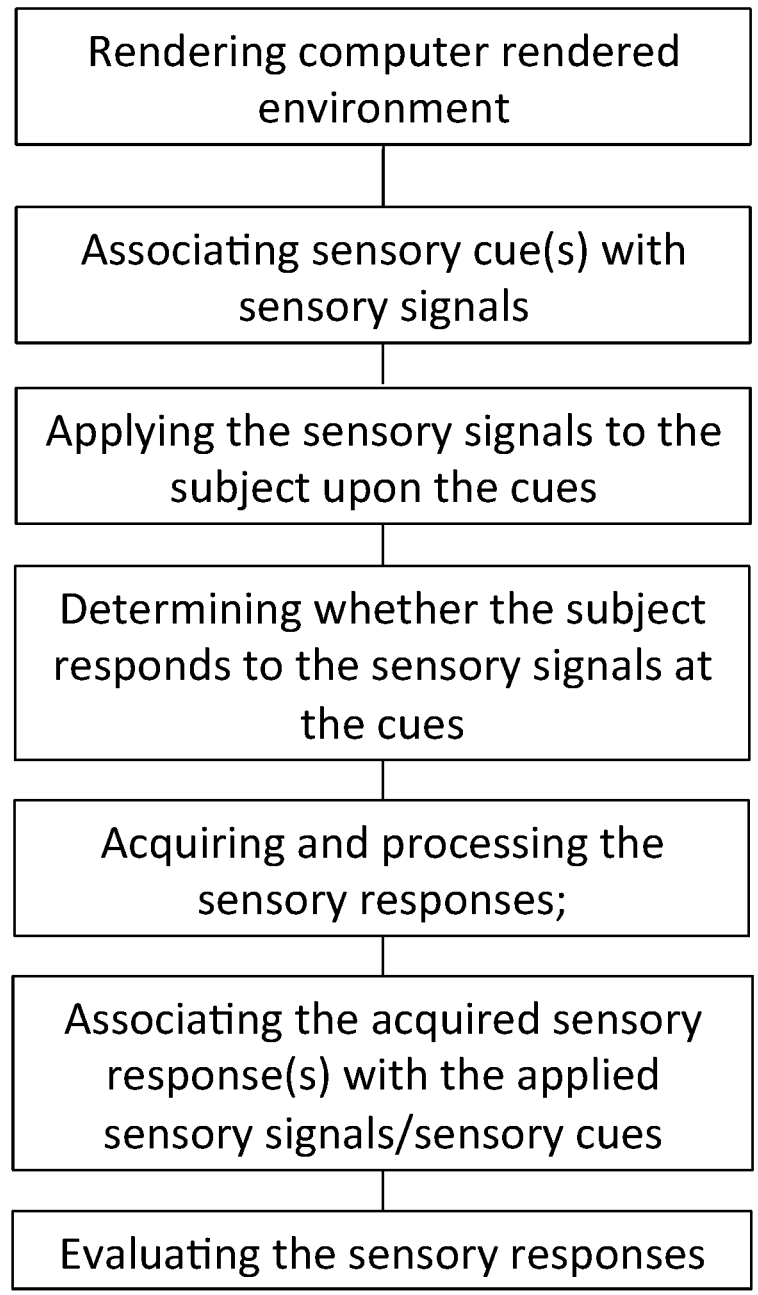
FIG. 8 shows a schematic chart of another exemplary method in accordance with the present disclosure.

In accordance with a further aspect of the present disclosure as shown in FIG. 8, there is provided a method of performance profiling of the user. The method may include any or all of: rendering an artificial/computer rendered environment of any of a virtual reality, augmented reality, or a mixed reality thereof; determining one or more parts/locations of the user's body each of which is at least communicatively in contact with sensory signal generator(s); associating sensory signals with corresponding parts of the user's body; immersing the user to interact with the computer rendered environment; applying the associated sensory signals to the user during the interaction; determining whether the user responds to the sensory signals during the interaction; and/or, acquiring and processing the sensory responses; associating the acquired sensory response(s) with the interactions and/or the applied sensory signal(s) and/or types and/or locations of the sensory generators in the user's body; and evaluating the sensory responses such as determining any of kinds, types, and or properties of the sensory response(s).

In some examples, the user may be physically and/or neurologically stimulated during interaction with the computer rendered environment. That stimulation may affect one or more of the user's physiological parameters (e.g., blood pressure, breadth, body temperature, eye properties, brain waves etc.). In various embodiments, the interactive system 500 can determine the effect of the stimulations with sensory signals on the measured physiological parameters, for example, by collecting physiological data and comparing the collected data with reference data and/or previously collected data. The effect of the stimulation can be analyzed against an analytical model to allow a correlation between the effects of the stimulation and a current or future physiological state or clinical condition of the user.

According to an embodiment of the present disclosure, the interactive system 500 may include a plurality of databases. For example, the databases associated with the sensory response processing unit 800, sensory signal generating unit 700, and the image rendering unit 600 may be configured to be updated before, during, and/or after interaction with the computer rendered reality. In one aspect, the sensory response processing unit 800 may include a response computing unit 810 monitoring sensory responses of the user, a reference value, a minimum threshold and maximum threshold values for each sensory response, and each sensor status information, such as a sensor identification, type, location, and system operating parameters such as the working status of each sensor, the power levels.

As described in FIG. 6, in some aspects, the interactive system 500 may be configured to register or synchronize the locations and/or types of one or more sensory stimulators 730 connected with parts of actual body of the user. In another aspect, the interactive system 500 may be configured to register and/or time-synchronize a plurality of sensory responses upon the interaction so that an interaction(s) can be associated with the corresponding sensory stimulation(s) and sensory response(s) in a synchronized manner. Once the interaction is rendered, the image rendering unit and/or the signal generating unit 700 may determine the sensory information corresponding to the interaction. According to the sensory information, the sensory signal generators 730 may stimulate the parts of the user's actual body.

In another exemplary embodiment, the sensory signal generating unit 700 may be configured to adjust the degree of stimulation of one or more stimulators. The sensory signal generating unit 700 may include a database as shown in FIG. 6. A series of stimulation data applied to the user may be stored in the database 720. Based on the stored stimulation data, the sensory signal generating unit 700 may adjust the degree of stimulation of one or more stimulators. The sensory signal generating unit 700 may be configured to incrementally adjust the degree of stimulation. In a certain aspect, the sensory information may be programmably stored so that the sensory information can be updated if desired as the sensory responses of the actual body and/or the sensory signals are updated.

Figure 9:
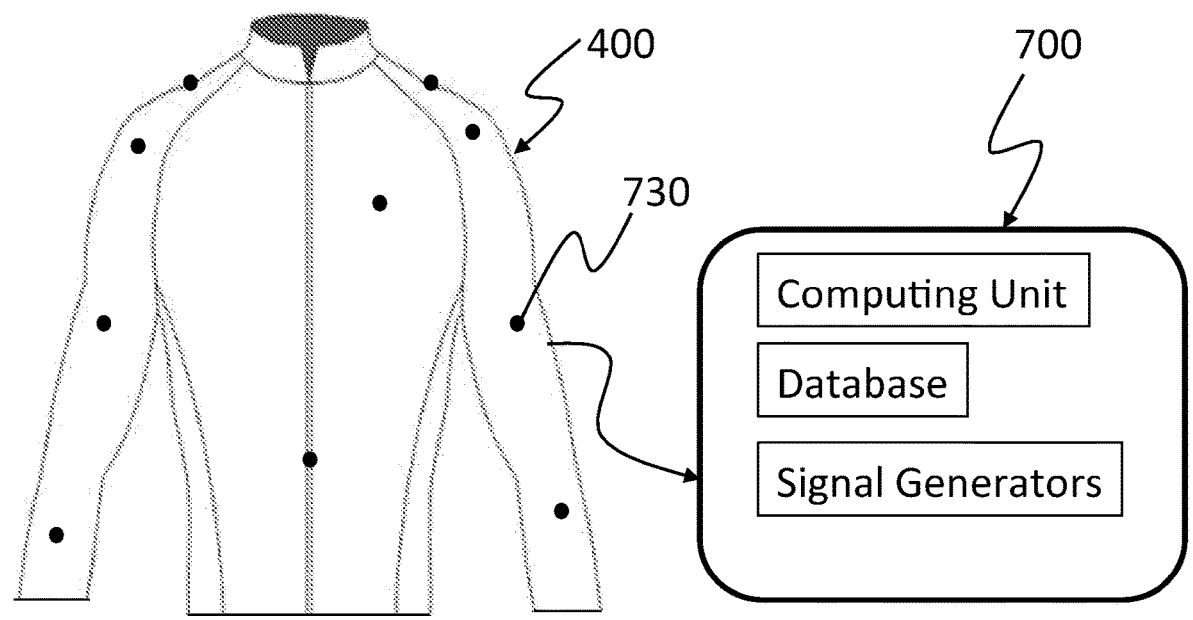
FIG. 9 shows a schematic chart of another exemplary method in accordance with the present disclosure.
Figure 10:
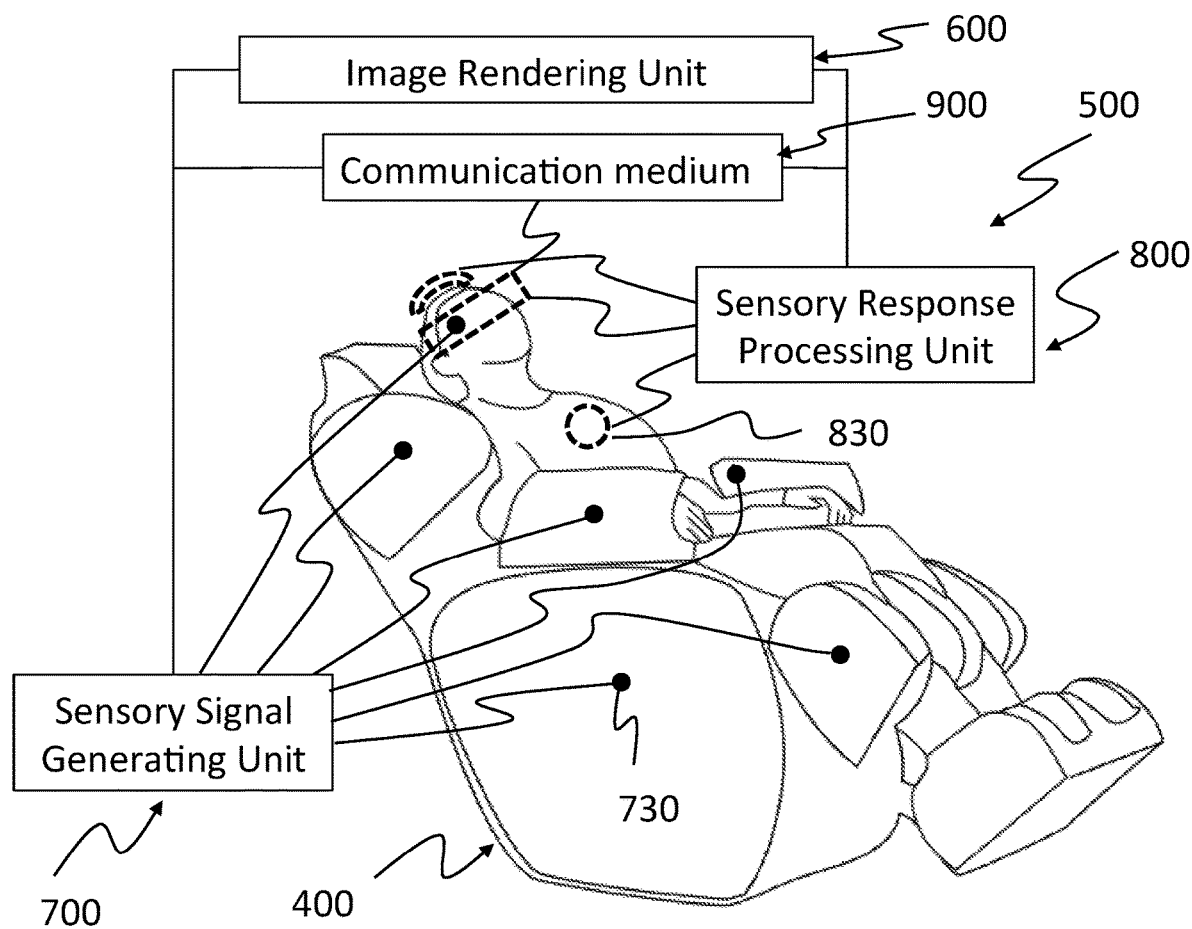
FIG. 10 shows a schematic diagram of an exemplary sensory signal generator in accordance with the present disclosure.

According to another embodiment of the present disclosure, the sensory signal generating unit 700 may include a signal computing unit 710 and one or more signal nodes/generators 730 with wireless or wired communication connection between the sensory signal generators 730. In another example, the sensory signal generators 730 may be integrated in an accommodating form 400. For example, FIG. 9 shows the sensory signal generators 730 integrated with a wearable garment. The sensory signal generating unit 700 may include a sensory stimulator (i.e. sensory signal generator) with a preamplifier or a group of micro-stimulators and a corresponding calculation unit, a common analog-exist in an embedded system, coupled with a wireless or wired communication, processor, power management module. In one aspect, the accommodating form 400 such as a chair, a body suit, a bed, and a body chamber, a head mounted display device, and a body capsule may be employed in conjunction with the sensory signal generators 730. FIG. 10 shows another example of the sensory signal generators 730 integrated with a chair.

According to the disclosure, the user can experience an immersive interaction with the computer rendered environment. It is possible that an interaction between a virtual object and a digital representation of the user involves a plurality of sensory information. For example, a single interaction may involve a plurality of sensory information including any of visual information, olfactory information, thermal information, and tactile information. When a plurality of sensory information are involved, the actual body of the user can simultaneously experience the plurality of sensory signals via the various types of sensory signal generators at least communicatively connected to the actual body of the user. Additionally, because each of virtual objects may contain a different combination of sensory information with respect to each other, the interactions with different virtual objects may have different combinations of sensory information.

The sensory response processing unit 800 may be configured to access any of image rendering database 620, sensory signal generating database 720, sensory response processing database 820. The databases may include original data such as previously measured sensory responses such as heart rate, heart health index, activity type, brain waves, eye properties, the user's health records and other related information. The databases may include all information of sensory response processing unit, sensory signal generating unit, and image rendering unit including system configuration, real-time operating parameters, and so on. The databases may be further configured to store the user's personal information, medical history, diagnosis and treatment programs, treatment attention to the physical parameters, such as alarm set value. In one aspect, the sensory signal generating unit 700 may be configured to communicate with the sensory response processing unit 800. The communication may include a new data analysis result, alarm trigger conditions, the user's update information, update alarm trigger condition, change in system settings and the like. With synchronization of the databases, the data being synchronized is updated and the corresponding operation will also be activated.

Figure 11:
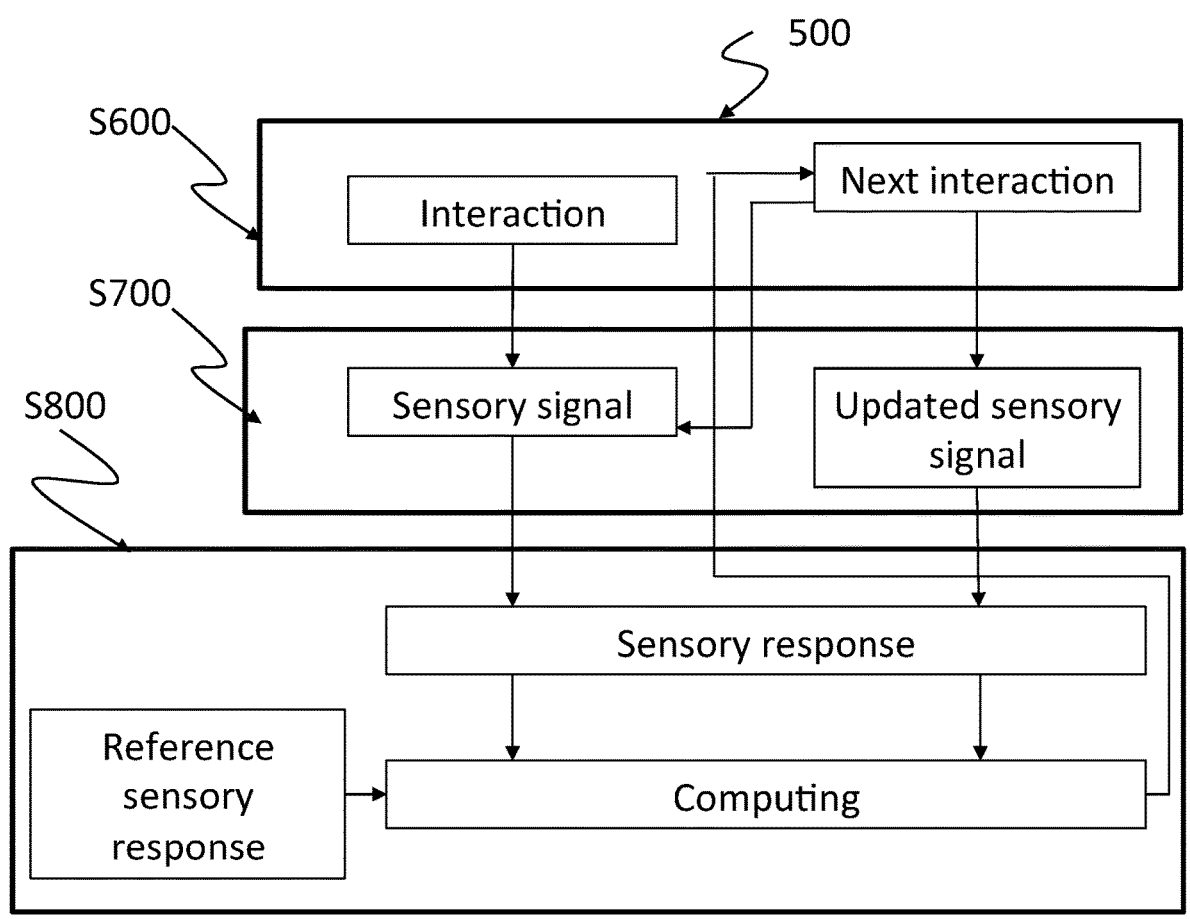
FIG. 11 shows a schematic diagram of another exemplary processing method in accordance with the present disclosure.

In accordance with a further aspect of the present disclosure, as shown in FIG. 11, there is provided a method to perform any or all of step s600, step s700 and step 800. Step s600 may include: rendering a computer rendered environment and sensory cue(s) between computer rendered objects. Step s700 may include any or all of: locating one or more sensory signal generators in one or more parts of the user, associating each of the one or more sensory signals with a pre-determined signal strength; associating each of one more parts of the user with a pre-determined sensory response information such as any of a type of sensory response, a reference value, a minimum threshold and maximum threshold; and applying sensory signal(s) with the sensory signal generating unit 700 to the one or more parts of the user upon activation of sensory cue(s). Step s800 may include any or all of: acquiring sensory response(s) from the one more parts of the user with the sensory sensors 830; comparing the acquired sensory response(s) with the pre-determined sensory response(s); if any of acquired sensory responses does not meet the pre-determined condition, adjusting the sensory signal associated with the unmet sensory response to a next sensory signal having a signal strength different from the previous signal strength. The method may repeat the interaction step s600, the sensory signal generating step s700 and the sensory response step s800 in the manner above until the lastest response meets the pre-determined condition while recording and updating the databases with the sensory signals, the sensory responses, and the associated sensory cues and thereby building a profile of the user. In some examples, types of the sensor cues may be different.

In many human-computer interactions, an individual user interacts with a technology. The interactions are divided into "active participations" and "passive participations". For example, an active participation of the user can be distinguished from a passive participation of the user by the predominance of monitoring tasks. If most of the tasks are monitoring tasks, rather than tasks requiring participation of the the user such as a prediction, planning, control, physical control etc., then the task would involve passive participation of the user. The involvement of user has a continuous underlying dimension of "activeness." The "activeness" of a user is a result of task allocation between the user and the technology. The level of control results in different levels of cognitive involvement of the user. An interaction with any of virtual objects may require different levels of concentration. For example, controlling an object in the computer rendered environment by the user while interacting with the computer rendered environment can be considered active participation. In some cases, such a concentration may be measured with sensory sensors such as brain sensor or eye tracking device. In an alternative example, the sensory response unit 800 may measure a strength value of sensory response of the user. The interactive system 500 may be configured, depending on the strength of the sensory response, to render an interaction between computer-rendered objects or stimulate the user, which alternatively indicates a level of activeness of the user.

In accordance with a further aspect of the present disclosure, there is provided a method performing any or all steps of: providing a user with a first task involving a plurality of interactions between computer rendered objects in the computer rendered reality, where any of the interactions in the first task are same or different from each other, where one or more or each of the interactions in the first task is associated with one or more of sensory signals, where each of the sensory signals has a pre-determined signal strength; applying the sensory signals associated with each of the interactions in the first task; acquiring one or more sensory responses resulted from the applied sensory signals during the interactions in the first task to build a data indicative of the sensory responses of the user. The method may repeat the steps with a second task to build another indicative of the sensory responses of the user. The method may compare the previous data and the second data to evaluate the physiological performance of the user. In any example herein, cognitive data for each sensory response can further include response time, response variance, correct hits, omission errors, number of false alarms (such as but not limited to a response to a non-target), deviance from a reference response, userive ratings, and/or performance threshold, or data from an analysis, including percent accuracy, hits, and/or misses in the latest completed session.

INDUSTRIAL APPLICABILITY

The interactive system 500 may include digital electronic circuitry, or computer hardware, firmware, software, or combinations of them. The interactive system 500 according to the disclosure is configured to be implemented with a computer program product tangible embodied in a machine-readable storage device for execution by a programmable processor, and methods steps thereof may be performed by a programmable processor executing a program of instructions to perform functions of the disclosure by operating on input data and generating output.

The implementable computer programs are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired and in any case, the language may be a compiled or interpreted language.

Suitable processors include, by way of example, both general and special purpose microprocessors. Generally, one or more computer processors are configured to receive instructions and data from a read-only memory and/or a random access memory. Storage devices suitable for tangibly embodying computer program instructions and data include all forms of non-volatile memory devices, such as EPROM, EEPROM, and flash memory devices; magneto-optical disks, and CD-ROM disks. Any of the foregoing may be supplemented by, or incorporated in, specially-designed ASICs (application-specific integrated circuits).

Sensory sensors(s) 830 may include any of a chemical sensor, an electrical sensor, an electromagnetic sensor, light sensor, an inertial sensor, a body temperature sensor, a blood pressure sensor, an electromyogram sensor, an auditory sensor, an electrocardiography sensor, an electroencephalography sensor, an electrocorticography sensor, a pulse oximetry sensor, a motion sensor, an optical sensor, a chemical sensor, a neural sensor, an accelerometer, a gyroscope, a fall detector, a photoplethysmogram sensor, a humidity sensor, a blood glucose sensor, a microphone sensor, a hearing sensor, an activity sensor or the likes.

Examples of physiological measurements measured with one or more sensory sensors 830 to provide measurement data may include, but are not limited to, the measurement of body temperature, hearing properties, eye properties, olfactory properties, muscle properties, tactile properties, heart or other cardiac-related functioning using an electrocardiograph (ECG), electrical activity using an electroencephalogram (EEG), event-related potentials (ERPs), functional magnetic resonance imaging (fMRI), blood pressure, electrical potential at a portion of the skin, and/or galvanic skin response (GSR) or the likes. The physiological measurements can also be made using, e.g., functional magnetic resonance imaging (fMRI), magneto-encephalogram (MEG), and/or functional near-infrared spectroscopy (fNIRS). The devices for making physiological measurements can include, e.g., an eye-tracking device or other optical detection device including processing units programmed to determine a degree of pupillary dilation, functional near-infrared spectroscopy (fNIRS), and/or a positron emission tomography (PET) scanner. An EEG-fMRI or MEG-fMRI measurement allows for simultaneous acquisition of electrophysiology (EEG/MEG) data and hemodynamic (fMRI) data.

In an exemplary application, the sensory sensors 830 may include one or more physiological and/or environmental sensor(s), which generate outputs that are fed as inputs into a processing circuitry. In this embodiment, a user interface can make information received from the sensory sensors 830 available to the user/user of the interactive system 500, and can make information received from the user available to the sensory response processing unit 800.

In another example, proximity detection such as one or more infrared proximity sensor(s) can be used to determine if the sensory response processing unit 800 is being worn by the user; furthermore, these proximity sensor(s) can be integrated with pulse profile sensor(s). In certain embodiments, the sensory response processing unit 800 can include one or more physiological and/or environmental sensors 830 such as a motion sensor, and/or a heart-rate sensor, for example, based on a pulse profile sensor such as a photoplethysmography sensor, or an electrocardiography sensor, and/or a skin conductance sensor, and/or an electroencephalography sensor.

The assessment of performance conditions in a user between normal and abnormal, abnormal being varying degrees of organic impairment or sensory dysfunction, includes determining measures of sensory responses, relationships between the sensory responses such as different frequency bands (spectral ratios), variances with respect to reference values, minimum and/or maximum values, and coherence values of the measured parts of the user. Ratings can be allocated to each of the sensor response, spectral ratios and selectively coherence measures. A relationship between the ratings permits for assigning a likelihood of a diagnosis between normal and abnormal conditions.

For example, a method of diagnosing a brain condition in the human may include measuring brain signals from an EEG unit about the head of a human, determining at least two coherence values of a brain region in the head of the user, the one coherence value being a coherence value within the posterior cortex, and second coherence value being that between the front and the back of the brain, applying a relationship between the values as a diagnostic evaluation of a brain condition such as dementia of the Alzheimer's-type or multi-infarct dementia, concussion and presenting such relationship.

In another example, quantitative electroencephalography can be utilized to measure several parameters that are useful in distinguishing performance conditions. They also are useful in determining the likelihood that a degenerative brain disease, such as Alzheimer's disease that affects primarily the cerebral cortex, or a disease prominently affecting subcortical white matter, such as multi-infarct dementia (MID), are contributing to cognitive losses in an individual case.

General performance may also be measured by on-going EEG activity. Spectral analysis of brain waves is performed when each electrical potential signal is displayed versus a unit of time as representative of a particular brain wave detected by an electrode. Each brain wave from each electrode is amplified in voltage the same percentage. The wavelengths or frequencies in each brain wave are measured and then a signal uniquely representing each frequency of the brain wave is sent to a computer for sorting of the different frequencies of which the signal is composed. The range as measured in Hertz (cycles per second) is defined by the computer and analyzed in terms of absolute microvolts of electrical potential, relative potentials, coherence values (the similarity of the signal between two points on the scalp), ratio symmetry (the relationship between two points in terms of a particular bandwidth), peak amplitude (the peak microvolts of a particular bandwidth), peak frequency (the highest frequency of a particular bandwidth), and phase (the time lag difference between the signals at two different points on the scalp).

EEG signals exhibit different frequencies depending upon varying activity. In an example, the EEG signal frequencies can be classified into four basic frequency bands, which generally referred to as "Delta" (0 to 4 Hertz); "Theta" (4 to less than a 8 Hertz); "Alpha" (8-13 Hertz); "Beta" (greater than 13 Hertz). One determines the predominant frequency of a particular channel during a particular time period by measuring the period of the EEG signal wave form shown on EEG record. The EEG signal wave form typically includes multiple frequency components. EEG outputs can be driven by specific extrinsic or endogenous events. For example, a regularly occurring stimulus will elicit a series of waves each time it is presented. The entire series is referred to as an event-related potential (ERP).

Sensory signal generator 730 may be configured to generate frequent and rare stimuli that are presented to a user during a first interaction task with a computer rendered environment such as virtual reality or augmented reality. The frequent and rare stimuli evoke the generation of sensory response such as brain signals or any other forms of sensory responses. The interaction task is configured to provide a series if interactions are associated with the task in a computer rendered/assisted environment such as virtual reality or augmented reality. Sensory responses are thereby evoked within the user as a result of a frequent, rare and task stimuli. In some examples, the sensory responses generated during epochs proximate in time with the rare stimuli presentations are analyzed and therefrom an event-related potential (ERP) average magnitude is determined and is stored for analysis purposes.

The image rendering unit 600 is used to perform a first interaction task between a user and a computed rendered reality environment. Detecting the sensory responses takes place such as can be accomplished via sensory sensors 830. The first interaction-derived responses are then appropriately amplified and filtered, as necessary and recorded in a database. If necessary, transforming of the sensory responses obtained during the first interaction task can take place. The transforming may include sampling the analog signals, converting them to digital format, removing unwanted artifacts and selecting if one desires specific epochs of the signals for further analysis. The image rendering unit 600 is used to perform a second interaction task. The second sensory responses are stored for analysis purposes. A comparison of the differences in magnitude and/or kind of the sensory responses obtained during the first interaction task and the second interaction task is performed.

In another example, a sensory response for indicating a heartbeat variation may include a signal which changes according to the heartbeat variation such as a signal of electrocardiography, a signal of pulse wave, a signal of blood pressure. Therefore, the sensor 830 which detects a sensory response for indicating the heartbeat variation includes any of a pulse wave sensor (plethysmograph), an electrocardiography sensor (electrocardiograph), a heart rate meter, a pulsometer, a blood flow meter, and a continuous sphygmomanometer.

The present disclosure also relates to the delivery of sensory signals (and/or fields) to a user with the sensory signal generating unit 700. The sensory signals may include any of electric signals, olfactory signals, sound signals, visual/optical signals, mechanical signals, vibrational signals, pressure signals, tactile signals, gaseous signals, thermal/temperature signals, neural signals, chemical signals, energy wave signals, or any combination thereof. For example, electrical stimulation of a brain with electrodes can be contemplated. The position of the electrode can be adjusted. The adjustments are made to the electrical stimulus signals, such as frequency, periodicity, voltage, current, etc. Parameters of stimulation include power level, frequency and train duration (or pulse number). The stimulation characteristics such as depth of penetration, strength and accuracy, may depend on the rise time, peak stimulation and the spatial distribution of the field of stimulation.

Nerve stimulation is thought to be accomplished directly or indirectly by depolarizing a nerve membrane, causing the discharge of an action potential; or by hyperpolarization of a nerve membrane, preventing the discharge of an action potential. Such stimulation may occur after electrical energy, or also other forms of energy, are transmitted to the vicinity of a nerve. Nerve stimulation may be measured directly as an increase, decrease, or modulation of the activity of nerve fibers, or it may be inferred from the physiological effects that follow the transmission of energy to the nerve fibers.

A non-invasive procedure is defined as being non-invasive when no break in the skin or other surface of the body, such as a wound bed is created through use of the method, and when there is no contact with an internal body cavity beyond a body orifice, for example, beyond the mouth or beyond the external auditory meatus of the ear. Such non-invasive procedures are distinguished from invasive procedures including minimally invasive procedures in that the invasive procedures insert a substance or device into or through the skin or other surface of the body, such as a wound bed or into an internal body cavity beyond a body orifice.

For example, transcutaneous electrical stimulation of a nerve is non-invasive because it involves attaching electrodes to the surface of the skin (or using a form-fitting conductive garment) without breaking the skin. In contrast, percutaneous electrical stimulation of a nerve is minimally invasive because it involves the introduction of an electrode under the skin, via needle-puncture of the skin.

Another form of non-invasive electrical stimulation, known as magnetic stimulation, involves the generation (induction) of an eddy current within tissue, which results from an externally applied time-varying magnetic field. Diathermy includes non-invasive methods for the heating of tissue, in which the temperature of tissues is raised by high frequency current, ultrasonic waves, or microwave radiation originating outside the body. The heating effects may be dielectric, wherein molecules in tissues try to align themselves with the rapidly changing electric field, and/or induced, wherein rapidly reversing magnetic fields induce circulating electric currents and electric fields in the body tissues, thereby generating heat. With ultrasound diathermy, high-frequency acoustic vibrations typically in the range of 800 to 1,000 kHz are used to generate heat in deep tissue.

Figure 14:
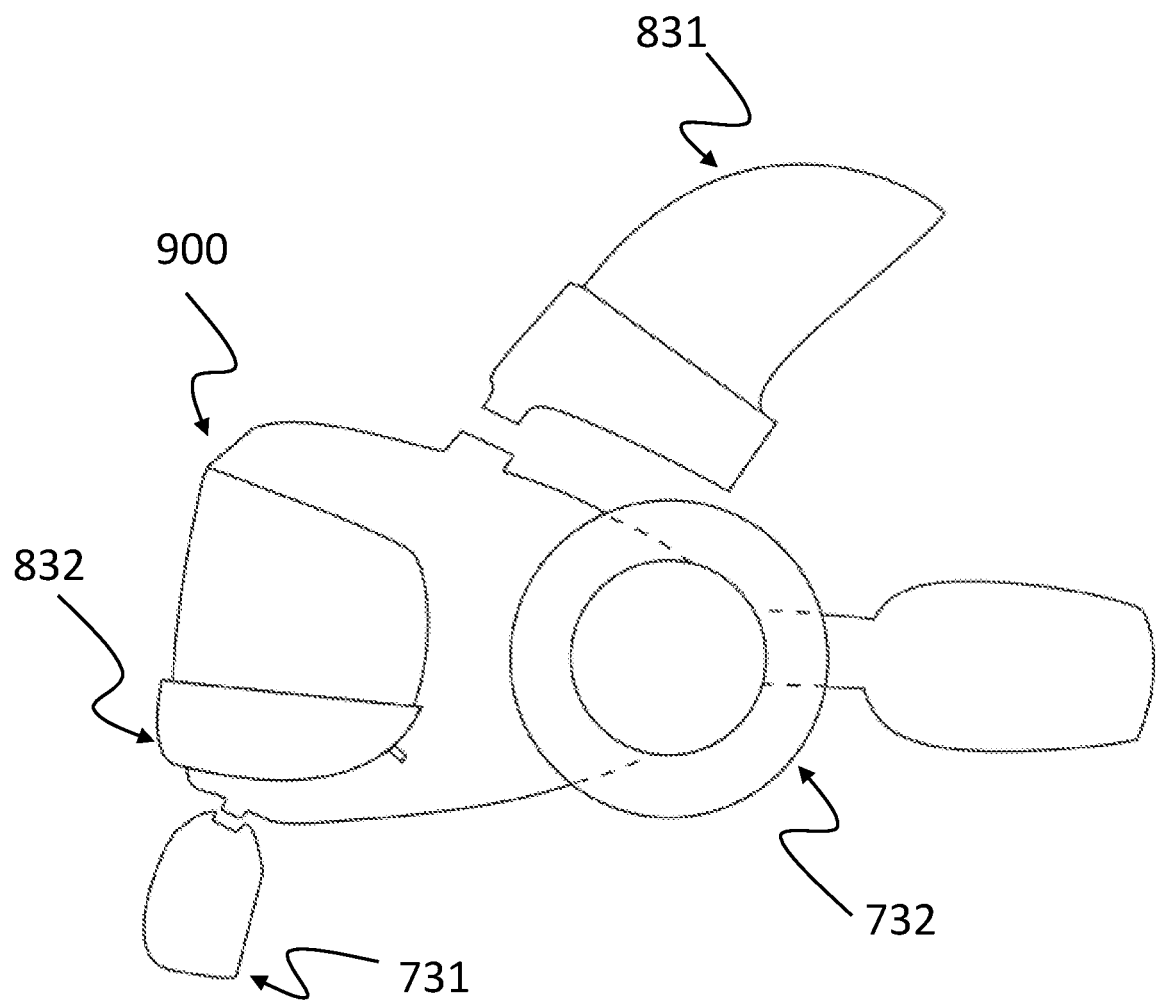
FIG. 14 shows an exemplary configuration of a head mounted device with various attachable devices.

Acupuncture may be a non-invasive stimulation if the acupuncture tool does not penetrate the skin. Electroacupuncture is often performed as a non-invasive transcutaneous form of electrostimulation. Laser acupuncture and colorpuncture are also non-invasive in that acupuncture meridian points are stimulated at the surface of the skin with light, rather than mechanically or electrically. In practice, the stimulators may be applied, or secured, to an anatomical site on a user such that the output of the energy-emitting elements is directed towards the user's skin such that the energy wave created by the stimulators is aligned to travel in the direction of one or more acupuncture meridians, or portions of one or more acupuncture meridians. This causes a corresponding wave, or flow of Qi energy along the underlying meridians. As shown in FIG. 14, stimulators can be located along the acupuncture meridians on the user's body or incorporated in an accommodating garment or form.

Other forms of non-invasive may include direct mechanical vibrations to selected organs or are used to massage muscles. For example, mechanical vibrations applied to the chest are used by physiotherapists to dislodge mucus in the lungs. Similarly, non-invasive mechanical ventilators use a face mask, an upper body shell known as a cuirass, or a Hayek Oscillator to force air in and out of the lungs, thereby avoiding the use of an invasive endotracheal tube.

In another example, drugs interfere with the way neurons send, receive, and process signals via neurotransmitters. Chemical stimulation can cause various sensory responses. An olfactory cognitive ability can be measured to check an olfactory cognitive ability for early diagnose geriatric depression, mild cognitive impairment (MCI), dementia, and the like, based on the examined olfactory cognitive ability. For example, one or more olfactory stimulus may be delivered to a user through the olfactory mucosa (ORE), olfactory nerves, sub-Perineural epithelial, and nerve fascicular interstitial spaces, olfactory bulb, entorhinal cortex, trigeminal nerve, cranial nerves I, II, III, IV, and VI on the wall of the sphenoid sinus, sphenopalatine ganglion afferent and efferent nerves, cranial-vertebral venous system (CVVS), and circumventricular organs (CVO). The stimulus can also be delivered to the brain and brainstem affected by Alzheimer's disease, bypassing the blood brain barrier (BBB) through a delivery catheter which incorporates iontophoresis and electroporation. For example, a nose or face mask equipped with olfactory stimuli may be connected with the communication medium 900. In certain aspects, a nose or face mask equipped with olfactory stimuli may be detachably connected to the communication medium 900 having a head-mounted display.

In examples herein, the interactive system 500 may include a computer rendering system such as virtual reality system, an augmented reality system, or a mixed reality system. A typical virtual reality system includes a computer, input devices, and an output device. The computer 610 of the image rendering unit 600 can maintain the model of the computer rendered environment such as virtual world and calculate its appearance from the view point of the user. The output device is often an apparatus of communication medium 900 that mounts on the user's head, or may be either a display or screen mounted to a virtual reality medium 900 as a communication medium such as a helmet or a pair of goggles or may be a display of a smartphone, such as but not limited to an iPhone, an Android-based smartphone, a tablet, a slate, an electronic-reader (e-reader), a digital assistant, or other electronic reader or hand-held, portable, or wearable computing device, or any other equivalent device, an Xbox, a Wii, Playstation or other computing system that can be used to render virtual reality-like elements. By wearing the helmet as a virtual reality medium 900, the user at least visually immerses himself or herself in the virtual world. Also, attached to the helmet may be equipped with any tracking devices that enable the computer to know about the position of the user's head and in what direction the user is looking. The input devices as communication medium 900 found on a typical system range from simple joysticks to gloves or other body wear that may monitor a user's movements and gestures. The video stream code such as a video game or a movie has a plurality of embedded/programmed markers associated with one or more interactions between virtual objects corresponding to the content of the video or the video game. Those markers as sensory cues may be configured to trigger the sensory signal generating unit 700 to apply sensory signals to the user. In another aspect, those markers as sensory cues may be configured to trigger the sensory response processing unit 800 to measure sensor responses of the user.

In examples herein, the sensory sensors 830 can be configured to measure sensory response of the user's eyes, heads, hands, feet, and/or any other part of the body. In some example implementations, the interactive system 500 can be formed as a virtual reality (VR) system (a simulated environment including as an immersive, interactive 3-D experience for a user), an augmented reality (AR) system (including a live direct or indirect view of a physical, real-world environment whose elements are augmented by computer-generated sensory input such as but not limited to sound, video, graphics and/or GPS data), or a mixed reality (MR) system (also referred to as a hybrid reality which merges the real and virtual worlds to produce new environments and visualizations where physical and digital objects co-exist and interact substantially in real time).

Humans have various senses. The commonly well-known senses may include ophthalmoception (sight/visual information), olfacoception or olfacception (smell/olfactory information), audioception (hearing/auditory information), tactioception (touch/tactile information), and gustaocception (taste/chemical information). Other senses would include thermoception (sense of temperature fluctuations), proprioception (kinesthetic sense), equilibrioception (balance), mechanoreception (vibration), and etc.

In one exemplary embodiment, the visual information as stimulant/sensory information may cause sensory responses from the user. Eyes of the user may first respond to the visual information. The measuring eye properties of the user may be carried out with an eye tracker equipped with one or more digital video cameras focused on the user's eyes as sensory sensor so that the eye properties are recorded. The eye tracker and the digital video camera(s) may be connected to the communication medium 900. In some examples, the digital video cameras are mounted on a user's head by a head mounted device. In various aspects, the eye tracker and/or the digital video cameras may be detachably connected to or integrated with a head-mounted display of the communication medium 900.

In some aspects, the image rendering unit 600 may control the stimulant information displayed in the communication medium 900. In another aspect, the sensory response processing unit 800 may be connected to the digital video cameras to receive and analyze the eye position information received from the digital video cameras. In some implementations, the communication medium 900 may include one or more audio speakers. The one or more audio speakers or headphones together with the visual display can deliver auditory information together with visual information as stimulant information/sensory information.

In another embodiment, a non-contact, optical method can be utilized such as video-based eye-trackers. For example, the one or more cameras focus on one or both eyes and record eye movements as the user looks at the display. The eye tracker 832 emits an infrared/near-infrared non-collimated light. This light is reflected in the user's eyes and creates corneal reflections (CR). The reflections are captured by the one or more digital video cameras. Through filtering and triangulation, the eye tracker determines a gaze point of the user and calculates eye movements.

Calibration of eye position may be provided prior to the communicating sensory information so that accurate real time measurements can be conducted during communicating the sensory information. The calibration can be conducted with one or more light points displayed on a display screen of the communication medium 900. The user is instructed to focus on each of the one or more light points while the digital video cameras are recording the pupil, iris and/or eye positions/sizes.

Figure 12:
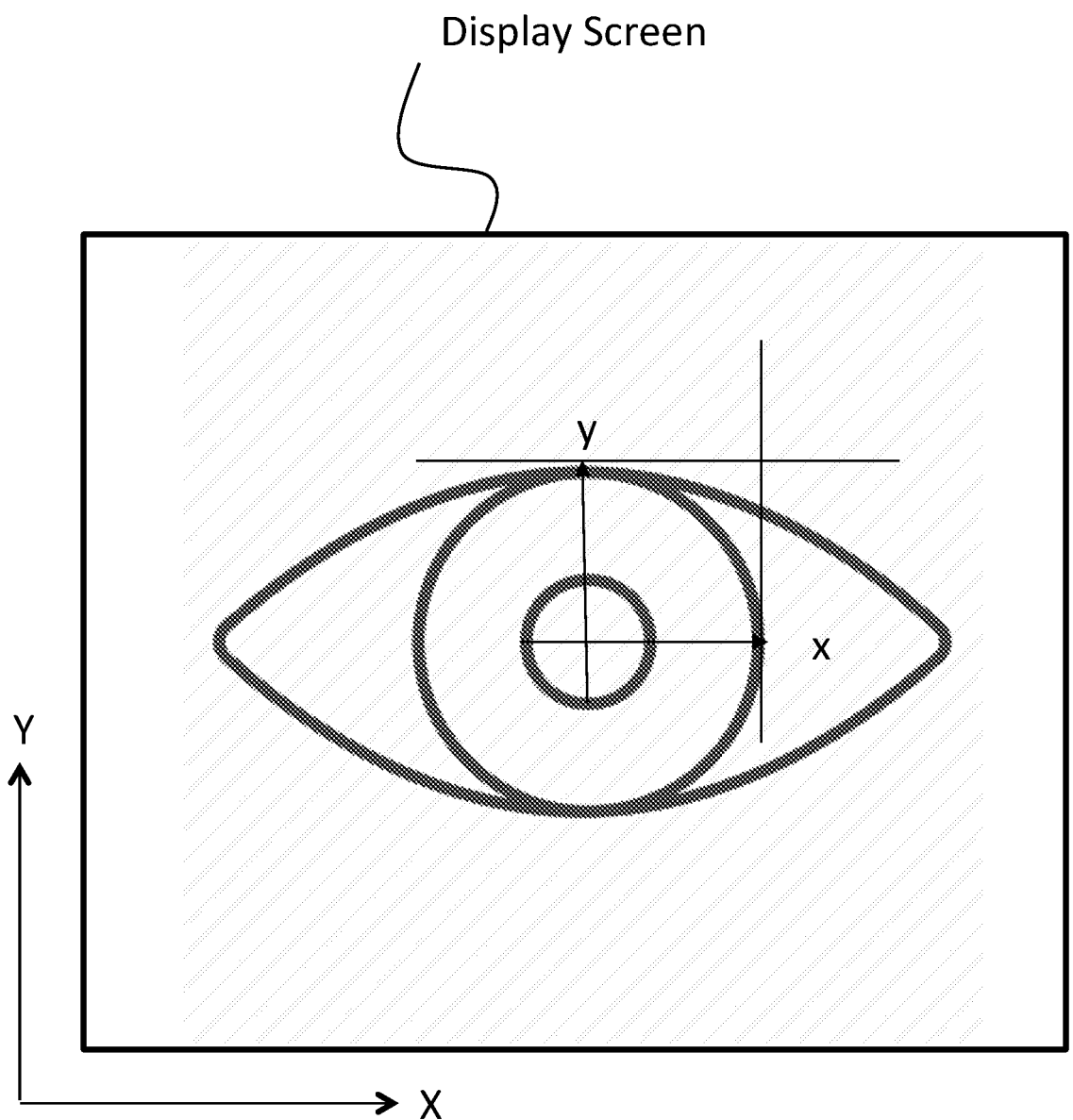
FIG. 12 shows an exemplary illustration of eye coordinates with respect to a display screen.

The sensory response processing unit 800 may map eye position with a coordinate system of the display screen with the recorded measurements so that the system can determine the position(s) of eye(s) within the coordinate system of the display screen as shown in FIG. 12. To aid a clear and unified visual perception while tracking a moving target, both eyes must be coordinated, so the image of the target falls on approximately corresponding areas of the fovea of each eye.

Brain impairment such as Dementia, ADHD, Schizophrenia, Autism, and Concussion can increase the differential in eye movements between the two eyes in position or reaction time. In accordance with some embodiments, the eye position of the user may be measured horizontally and vertically. In various aspects, the eye position of each eye may be measured with respect to a display screen assigned to each eye. By comparing the eye positions of both eyes at any point in the duration time of the communication, it is possible to measure the disconjugacy of binocular coordination. Eye tracking movement samples may be obtained at any suitable frequency, such as for instance, 1 Hz to 10,000 Hz or more. In some examples, the frequency may be in the range of 1 Hz to 3000 Hz. In other examples, the frequency may be in the range of 50 to 60 Hz.

To measure sensory responses, one or more sensory cues may be provided to measure a user's level of sensory response. The sensory cues would improve user experience via a deeper level of user interface interaction with the stimulant information. For example, to measure the eye properties, one or more visual cues as sensory cues may be provided to control a user's level of attention to the sensory information. The visual cues may include any visual object and/or content that can be displayed on a display screen. Determining the extent to which the user is attending can indicate a cognitive state of a user. For example, an attention state of the user can be categorized, for example, a fully attentive state, a not-attending state, or a search state.

The visual cues are configured to draw attention of the user. In a virtual reality and/or augmented reality, a visual cue may be a visual object. In another aspect, a visual cue may be a visual interaction between two visual objects. In another aspect, the interaction may involve a user's participation. For example, in a computer rendered environment such as virtual reality or augmented reality, the computer rendered environment may allow the user to initiate or control intentional, attentive, conscious and/or voluntary interaction, which involves active participation of the user, with a visual object via a digital representation of the user in the environment. During the interaction, the cognitive state of the user would be fully attentive.

In another exemplary embodiment, to measure olfactory responses of a user, a digitally controlled and operated odor generator may be utilized as a sensory signal generator 730 providing odors as sensory signals. The odor generator 731 includes a jetting device capable of dispensing controlled amounts of volatile fluid and can be located in proximity of the user's nose and dispense a controlled amount of volatile fluid or vapor chemicals from the jetting device toward the nose. The odor generator may be at least communicatively connected to an image rendering unit 600. In another example, the odor generator may be detachably connected a head mounted device together with the communication medium 900.

In another exemplary embodiment, to measure audioception responses, a sound generator such as a headphone 732 or a speaker as a sensory signal generator 730 can be at least communicatively connected with in image rendering unit 600. Sounds as sensory signals are projected at different tones, intensities, and frequencies. The user then indicates which sounds they are able to hear. One-sided versus bilateral hearing loss can be differentiated with controlling the speaker directed to each ear. In another aspect, a bone oscillator may be utilized. The bone oscillator is a transducer that may be attached to the end of a metal headband. The headband is placed over the head with the transducer resting on top of the mastoid bone behind the ear where the sounds are heard through the vibration of the mastoid bone in the skull. The headphone or any other form of sound generator may be at least communicatively connected to the image rendering unit 600. In another example, the sound generator may be detachably connected a head mounted device. In another example, the sound generator may be detachably connected a head mounted device together with the communication medium 900.

In another exemplary embodiment, vocal communication or speaking may be contemplated as a sensory response. For example, speech therapy is the assessment and treatment of communication problems and speech disorders. An articulation disorder is the inability to properly form certain word sounds. A resonance disorder occurs when a blockage or obstruction of regular airflow in the nasal or oral cavities alters the vibrations responsible for voice quality. Expressive language disorder is difficulty conveying or expressing information. Difficulty communicating because of an injury to the part of the brain that controls the user's ability to think is referred to as cognitive-communication disorder. Dysarthria is characterized by slow or slurred speech due to a weakness or inability to control the muscles used for speech. It's most commonly caused by nervous system disorders and conditions that cause facial paralysis or throat and tongue weakness, such as multiple sclerosis (MS), amyotrophic lateral sclerosis (ALS), and stroke. Therefore, any sensory cue requiring vocal communication of the user can be provided in a manner to measure the user's ability to produce, pronounce, speak, and/or read any vocal sound, a word, a phrase, and a conversation. The sensory response processing unit 800 may include a microphone, a recorder or a sound controller configured to transmit/receive/record a sound. Such devices may be detachably connected to a head mounted device.

To further enhance the engagement of the user, a plurality of sensory cues or signals may be provided. For example, the visual cue may be provided together with other stimulants/signals such as olfactory stimulant, sound stimulant, and/or tactile stimulant.

The sensory response may also include brain signals to indicate the neurological state of a user. The brain signals can take a form of brain waves. The sensory response processing unit 800 may include a brain signal device 831 such as EEG (electroencephalogram) to measure the brain electric signals as shown in FIG. 14. The brain signal device may include one or more electrodes to acquire electrical signals from the user. The brain signal device may be integrated with a head-mounted device of the communication medium 900. In other examples, the brain signal device may be detachably connected to a display device of the communication medium 900. The brain signal device may be at least communicatively connected with the image rendering unit 600. In an alternative example, the brain signal device 831 may measure the brain electric signals of the user. The interactive system 500 may be configured, depending on a strength of the brain signals, to render an interaction between computer-rendered objects. If the measured value is higher than a pre-determined value, the interactive system 500 may render an interaction associated with any of the brain signals between two or more computer-rendered objects.

Figure 13:
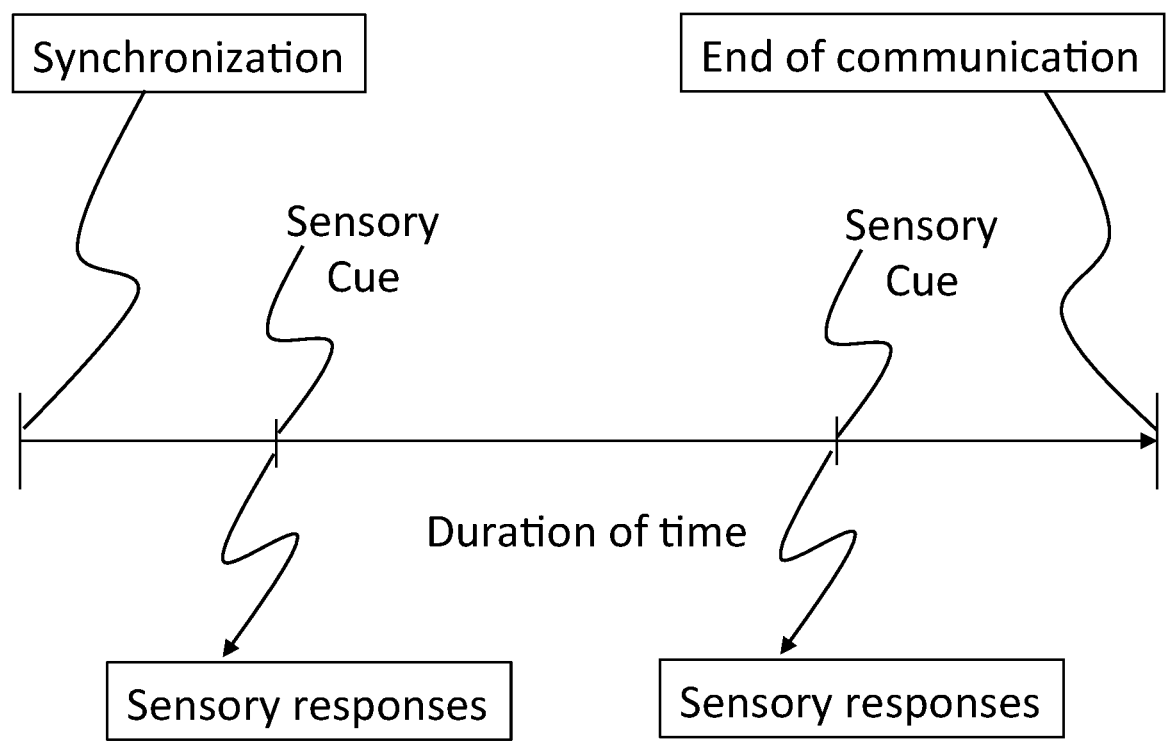
FIG. 13 shows a schematic diagram of a pre-determined duration of time of communication.

In some embodiments, the communication with the computer rendered environment may be carried out for a pre-determined duration of time as shown in FIG. 13. During the duration, the sensory information such as sensory cues and signals may be provided. In a computer rendered environment, the sensory cues can be programmably added and controlled to measure various attentive states of the user. The sensory response processing units 800 may measure the sensory responses during the pre-determined duration of time. In some examples, the sensory response processing units 800 may measure the sensory responses at the time of displaying/providing a sensory cue(s). For example, the eye tracking device and the brain signal device would be time and/or machine synchronized so that they can be simultaneously operated during the communication. The pre-determined duration of time may be 5 sec or more, for example, 30, 60, 90, 120, 150, 180, 200, 220, 240, 270, 300, 330, 360, 400, 450, 500 seconds or more, depending on the types of sensory responses to be measured. In some examples, the pre-determined duration of time may be 30 mins or more. During the pre-determined duration of the communication of sensory information, any or each of the sensory response processing units 800 may continuously measure the sensory responses. Alternatively, any or each of the sensory response processing units 800 may intermittently measure the sensory responses and mark (record) the time of measurement. In some examples, any or each of the sensory response processing units 800 may be configured to selectively measure the sensory responses at least at one sensory cue and mark (record) the time of measurement and/or duration of measurement time such as 1 sec, 2 sec, 5 sec, 10 sec or more for the sensor cue. In another example, any or each of the sensory response processing units 800 may measure the sensory responses only at the interaction with the sensory cue and mark (record) the time of each measurement with respect to the time scale of a total duration of time of communication. In another example, any or each of the sensory response processing units 800 may measure the sensory responses at every sensory cue and mark (record) the time of each measurement with respect to the time scale of a total duration of time of communication as in FIG. 13.

Because the sensory response measurements can be synchronized with the duration of the communication, it is possible to compare various sensory responses in the same cognitive state of the user. For example, it is possible to compare the measured brain signals and the analyzed eye properties for the duration, or for each visual cue. Together with intentional, attentive, conscious and/or voluntary interaction with a visual object initiated by the user as a sensory cue, the measuring multiple sensory responses in a synchronized manner significantly reduces any uncertainty associated with a single measurement of the cognitive state of a user.

Clauses

Clause 1. A method for communicating sensory information with an interactive system, including any of: configuring the interactive system to render a computer rendered environment comprising at least one computer rendered object; configuring the interactive system to render a representation of a user in the computer rendered environment; configuring the interactive system to render an interaction between the at least one computer rendered object and the representation of the user; configuring the interactive system to stimulate an actual body of the user upon the interaction; and configuring the interactive system to measure a sensory response of the actual body of the user upon activation of a sensory cue.

Clause 2. The method of Clause 1, wherein the interactive system includes one or more sensory stimulators including any of electric stimulators, visual stimulators, electric muscle stimulators, humidity stimulators, thermal stimulators, neural pulse stimulators, nerve stimulators, muscle vibrators, drug injectors, drug patches, air deliveries, pressurizers, chemical patches, mechanical muscle stimulators, piezo stimulators, electro-magnetic stimulators, speakers, hearing devices.

Clause 3. The method of Clause 1, including: configuring the interactive system to convey visual information to eyes of the user.

Clause 4. The method of Clause 3, further including: configuring the interactive system to measure eye movement of the user.

Clause 5. The method of Clause 1, wherein the interactive system includes one or more sensory sensors to measure the sensory response, wherein the one or more sensory sensors include any of an electrocardiograph (ECG) sensor, an electrical activity using an electroencephalogram (EEG) sensor, a MEG (magnetoencephalography) sensor, a NIRS (Near-Infrared Spectrometer), an event-related potentials (ERPs) sensor, a functional magnetic resonance imaging (fMRI) sensor, a blood pressure sensor, an olfactory sensor, an electrical potential sensor, a galvanic skin response (GSR) sensor, an eye tracking device, a microphone and a sound recorder.

Clause 6. The method of Clause 1, wherein the interaction is initiated by the user.

Clause 7. The method of Clause 1, including: configuring the interactive system to render a plurality of interactions between one or more computer rendered objects and the representation of the user, wherein at least one of the interactions is associated with the sensory cue, wherein the interactive system is configured to measure the sensory response upon the activation of the sensory cue associated with the at least one interaction.

Clause 8. The method of Clause 7, including: configuring the interactive system to stimulate the actual body of the user upon the at least one interaction associated with the sensory cue.

Clause 9. The method of Clause 7, including: configuring the interactive system to measure the sensory response of the actual body of the user at every interaction with a sensory cue.

Clause 10. The method of Clause 7, wherein each of two or more of the plurality of interactions is associated with a sensory cue.

Clause 11. The method of Clause 1, including: configuring the interactive system to measure a plurality of sensory responses of the actual body of the user.

Clause 12. The method of Clause 1, including: configuring the interactive system to measure a brain signal of the user.

Clause 13. The method of Clause 1, including: configuring the interactive system to render a plurality of interactions with the computer rendered object and the representation of the user.

Clause 14. The method of Clause 13, including: configuring the interactive system to determine a type of each of the interactions, and configuring the interactive system to stimulate the actual body of the user based on the determined type of the interaction.

Clause 15. The method of Clause 1, including: configuring the interactive system to compare a value of the measured sensory response with a pre-determined value.

Clause 16. The interactive system configured according to Clause 1.

Clause 17. The interactive system of Clause 16, including: an image rendering unit configured to render the computer rendered environment comprising at least one computer rendered object, the representation of a user in the computer rendered environment, and interaction between the at least one computer rendered object and the representation of the user.

Clause 18. The interactive system of Clause 16, including: a sensory signal generating unit to stimulate the actual body of the user.

Clause 19. The interactive system of Clause 16, including: a sensory response processing unit to measure the sensory response of the actual body of the user.

Clause 20. The interactive system of Clause 16, including: a communication medium to convey visual information to the user.

The disclosure may be understood more readily by reference to the above detailed description taken in connection with the accompanying Figures and examples, which form a part of this disclosure. It is to be understood that the disclosure is not limited to the specific devices, methods, applications, conditions or parameters described and/or shown herein, and that the terminology used herein is for the purpose of describing particular embodiments by way of example only and is not intended to be limiting of the claimed invention. Also, as used in the description including the appended claims, the singular forms "a," "an," and "the" include the plural, and reference to a particular numerical value includes at least that particular value, unless the context clearly dictates otherwise. The term "plurality" as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the disclosure that are, for brevity, described in the context of a single embodiment, may also be provided separately or in any sub-combination. Further, reference to values stated in ranges includes each and every value within that range.

I claim:

1. A method for communicating sensory information with an interactive system, comprising:
    configuring the interactive system to provide a computer rendered environment at least partly constructed with object-oriented programming to a user;
    configuring the interactive system to at least communicatively connect with a user monitoring system to monitor the user while the user is interacting with the interactive system to build user data of the user;
    configuring the interactive system for active participation of the user during the interaction, wherein the active participation includes at least partly controlling the computer rendered representation of the user by the user during the interaction;
    configuring the interactive system to determine at least one interaction wherein the at least one interaction is between a computer rendered representation of the user and a same computer rendered object in the computer rendered environment,
    configuring the interactive system to process a plurality of types of interaction associated with the at least one interaction with the same computer rendered object in the computer rendered environment, wherein each of the plurality of types of interaction is associated with at least one sensory information, wherein sensory information associated with each of the plurality of types of interaction is different from each other among the plurality of types of interaction;

configuring the interactive system to determine any of locations of a plurality of sensory stimulators connected to an actual body of the user with respect to the actual body of the user;

configuring the interactive system to determine a type of the at least one interaction among the plurality of types of interaction associated with the at least one interaction;

configuring the interactive system to determine sensory information associated with the type of the at least one interaction;

configuring the interactive system to stimulate the actual body of the user with the determined sensory information associated with the determined type of the at least one interaction;

configuring the interactive system to acquire a sensory response of the actual body of the user associated with the location of the sensory stimulator with respect the body of the user upon the stimulation; and configuring any of the interactive system and the user monitoring system to transmit the user data including the sensory information, the location of the stimulator and the sensory response to a response processing system, wherein the response processing system is configured to generate user performance data.

2. The method of claim 1, wherein the user monitoring system comprises one or more sensory stimulators to stimulate the user, wherein the one or more sensory stimulators comprises any of electric stimulators, electric muscle stimulators, humidity stimulators, visual stimulators, thermal stimulators, neural pulse stimulators, nerve stimulators, muscle vibrators, drug injectors, drug patches, air deliveries, pressurizers, chemical patches, mechanical muscle stimulators, piezo stimulators, electro-magnetic stimulators, speakers, and hearing devices.

3. The method of claim 1, wherein the user monitoring system is configured to monitor any of movements and gestures of the user to process the plurality of types of interaction.

4. The method of claim 3, wherein the user monitoring system is configured to measure eye movements of the user.

5. The method of claim 1, wherein the user monitoring system comprises one or more sensory sensors to measure one or more sensory responses of the user, wherein the one or more sensory sensors include any of an electrocardiograph (ECG) sensor, an electrical activity using an electroencephalogram (EEG) sensor, a MEG (magnetoencephalography) sensor, a NIRS (Near-Infrared Spectrometer), an event-related potentials (ERPs) sensor, a functional magnetic resonance imaging (fMRI) sensor, a blood pressure sensor, a laser sensor, an infrared sensor, an olfactory sensor, an electrical potential sensor, a galvanic skin response (GSR) sensor, an eye tracking device, a microphone and a sound recorder.

6. The method of claim 1, further comprising:
configuring any of the interactive system, the user monitoring system and the response processing system to associate the interaction with one or sensory responses of an actual body of the user;
wherein the user monitoring system is configured to measure the one or more sensory responses upon the interaction.

7. The method of claim 1, further comprising:
configuring the interactive system to control the user monitoring system to stimulate an actual body of the user upon the interaction.

8. The method of claim 1, wherein the user monitoring system is configured to track user's movements using at least one sensor attached to the user.

9. The method of claim 1, comprising:
configuring the interactive system to at least communicatively connect with the user monitoring system to monitor the user while the user is performing a first task interacting with the interactive system to build first user data of the user,
wherein the first task comprises a plurality of interactions between the user and the interactive system,
wherein the user monitoring system is configured to continuously collect one or more sensory responses of the user during the first task.

10. The method of claim 9, comprising:
configuring the interactive system to update the computer rendered environment for a second task after the first task.

11. The method of claim 10, comprising:
configuring the interactive system to adjust the user monitoring system in accordance with the second task.

12. The method of claim 1, wherein the computer rendered environment comprises any of virtual reality, augmented reality and mixed reality.

13. A method for communicating sensory information with an interactive system, comprising:
providing a user with a computer rendered environment at least partly constructed with object-oriented programming via the interactive system;
monitoring the user while the user is interacting with the interactive system to build user data of the user;
rendering a computer rendered representation of the user in the computer rendered environment;
controlling the computer rendered representation of the user for active participation of the user during an interaction, wherein the active participation includes at least partly controlling the computer rendered representation of the user by the user during the interaction;
rendering the interaction between at least one computer rendered object and the computer rendered representation of the user in the computer rendered environment;
processing a plurality of types of interaction associated with the at least one interaction with the same computer rendered object in the computer rendered environment, wherein each of the plurality of types of interaction is associated with at least one sensory information, wherein sensory information associated with each of the plurality of types of interaction is different from each other among the plurality of types of interaction;
determining a type of the interaction and sensory information associated with the interaction;
controlling the user monitoring system to apply the sensory information to an actual body of the user upon the interaction;
measuring a sensory response of an actual body of the user upon the interaction;
transmitting the user data to a response processing system; and
generating user performance data based on the user data.

14. The method of claim 13, comprising:
associating the sensory response with the interaction.

15. The method of claim 13, comprising:
tracking user's movements using one or more sensors attached to the user.

16. The method of claim 13, wherein the computer rendered environment comprises any of virtual reality, augmented reality and mixed reality.

17. An interactive system, comprising:
- an image rendering unit configured to provide a computer rendered environment at least partly constructed with object-oriented programming to a user;
- a user monitoring unit to monitor the user while the user is interacting with the interactive system to build user data of the user; and
- a response processing unit to process the user data, wherein the response processing unit is configured to generate user performance data,
- wherein the interactive system is configured for the user at least partly to control the computer rendered representation of the user for active participation of the user during the interaction,
- wherein the interactive system is configured to determine at least one interaction,
- wherein the interaction is between a computer rendered representation of the user and a computer rendered object in the computer rendered environment,
- wherein the interactive system is configured to process a plurality of types of interaction associated with the at least one interaction with the same computer rendered object in the computer rendered environment, wherein each of the plurality of types of interaction is associated with at least one sensory information, wherein each of the plurality of types of interaction is associated with at least one sensory information, wherein sensory information associated with each of the plurality of types of interaction is different from each other among the plurality of types of interaction,
- wherein the interactive system is configured to determine a type of interaction and sensory information associated with the interaction,
- wherein the interactive system is configured to measure one or more sensory responses of an actual body of the user upon the interaction.

18. The interactive system of claim 17, the user monitoring unit comprises one or more sensory sensors to measure one or more sensory responses of the user, wherein the one or more sensory sensors include any of an electrocardiograph (ECG) sensor, an electrical activity using an electroencephalogram (EEG) sensor, a MEG (magnetoencephalography) sensor, a NIRS (Near-Infrared Spectrometer), an event-related potentials (ERPs) sensor, a functional magnetic resonance imaging (fMRI) sensor, a blood pressure sensor, a laser sensor, an infrared sensor, an olfactory sensor, an electrical potential sensor, a galvanic skin response (GSR) sensor, an eye tracking device, an inertial sensor, a microphone and a sound recorder.

19. The interactive system of claim 17, wherein the user monitoring unit is configured to continuously collect one or more sensory responses of the user while the user is interacting with the interactive system.

20. The interactive system of claim 17, wherein the computer rendered environment comprises any of virtual reality, augmented reality and mixed reality.

* * * * *